(12) United States Patent
King

(10) Patent No.: US 7,347,935 B2
(45) Date of Patent: *Mar. 25, 2008

(54) COMBINATION INLINE DISPENSER AND NON-FITTED CARTRIDGE

(75) Inventor: Joseph A. King, Hopkins, MN (US)

(73) Assignee: King Technology, Inc, Hopkins, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,395

(22) Filed: May 3, 2005

(65) Prior Publication Data

US 2005/0242016 A1 Nov. 3, 2005

Related U.S. Application Data

(63) Continuation of application No. 10/151,834, filed on May 20, 2002, now Pat. No. 6,908,551, which is a continuation-in-part of application No. 09/628,637, filed on Jul. 31, 2000, now Pat. No. 6,500,334.

(51) Int. Cl.
*C02F 1/68* (2006.01)

(52) U.S. Cl. .............. 210/198.1; 210/418; 137/268; 422/266; 422/282

(58) Field of Classification Search ............ 210/198.1, 210/205, 418; 137/268; 422/266, 282; 403/362
See application file for complete search history.

(56) References Cited

U.S. PATENT DOCUMENTS

| | | | | |
|---|---|---|---|---|
| 3,696,242 A * | 10/1972 | Patry | ............... | 248/219.2 |
| 4,370,305 A * | 1/1983 | Affonso | ............... | 422/292 |
| 4,662,387 A * | 5/1987 | King, Sr. | ............... | 137/268 |
| 5,124,032 A * | 6/1992 | Newhard | ............... | 210/169 |
| 5,251,656 A | 10/1993 | Sexton, Sr. | ............... | 137/1 |
| 5,407,567 A * | 4/1995 | Newhard | ............... | 210/198.1 |
| 5,855,777 A | 1/1999 | Bachand et al. | ............... | 210/205 |
| 6,210,566 B1 | 4/2001 | King | ............... | 210/169 |
| 6,544,415 B2 | 4/2003 | King | ............... | 210/205 |
| 6,908,551 B2 * | 6/2005 | King | ............... | 210/198.1 |

* cited by examiner

*Primary Examiner*—Matthew O. Savage
(74) *Attorney, Agent, or Firm*—Jacobson & Johnson

(57) ABSTRACT

An inline dispenser and purification device combination comprising an inline dispenser having fluid ports directly mateable to the ports of a fitted cartridge and a universal cartridge having no ports for connection with the fluid ports of the inline dispenser and a method of replacing a fitted cartridge located within a inline dispenser with a universal cartridge having no ports for connection with the fluid ports of the inline dispenser.

6 Claims, 13 Drawing Sheets

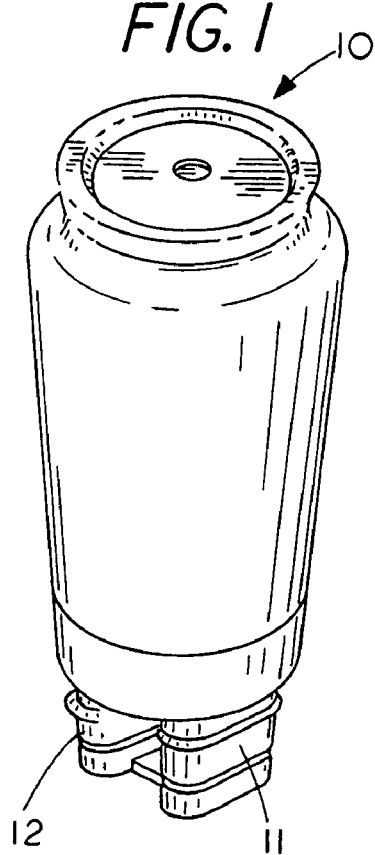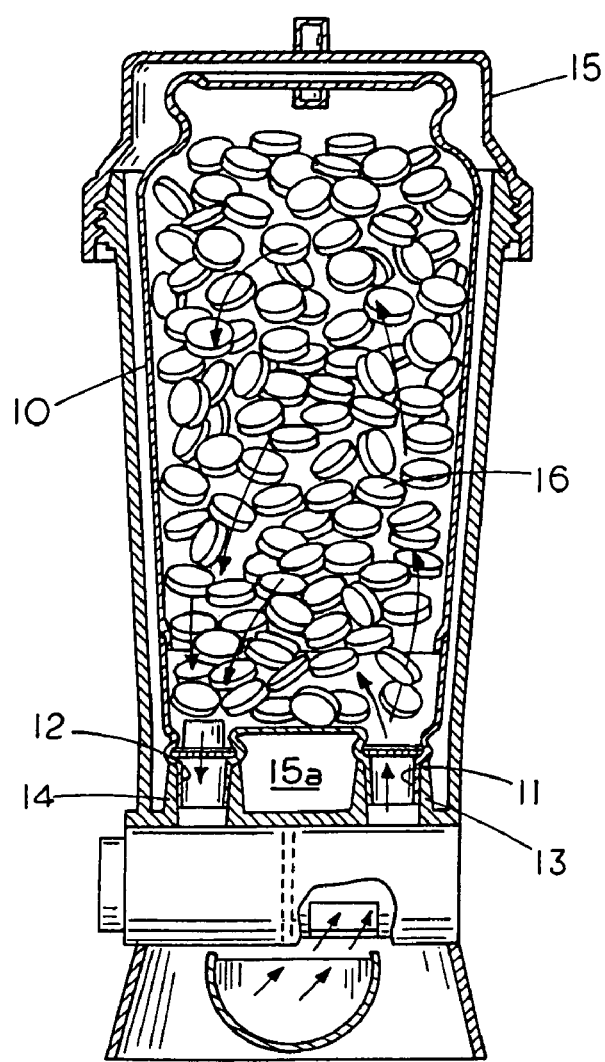

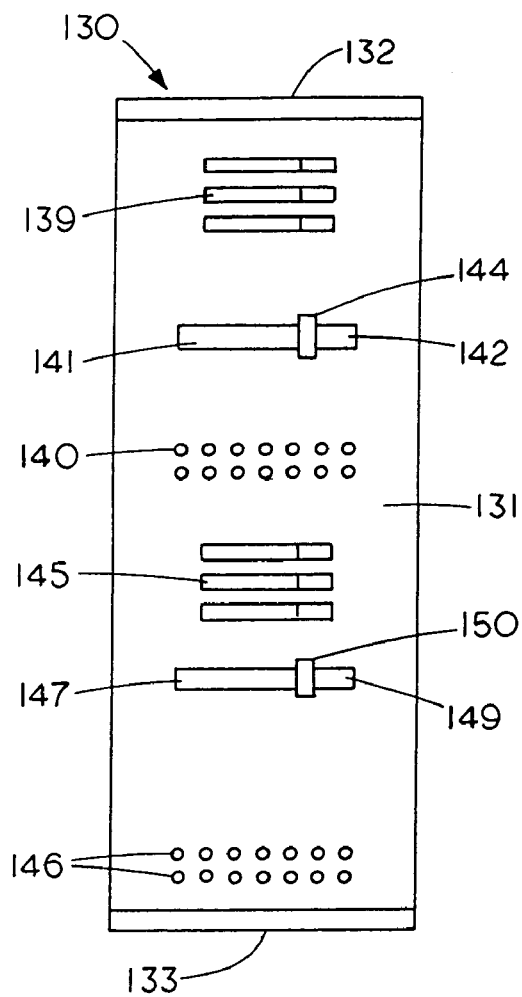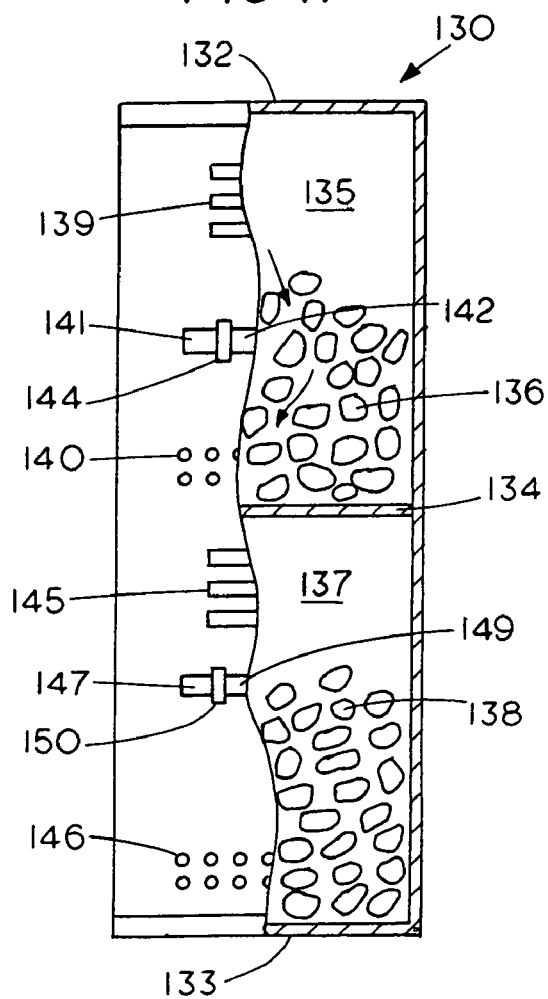

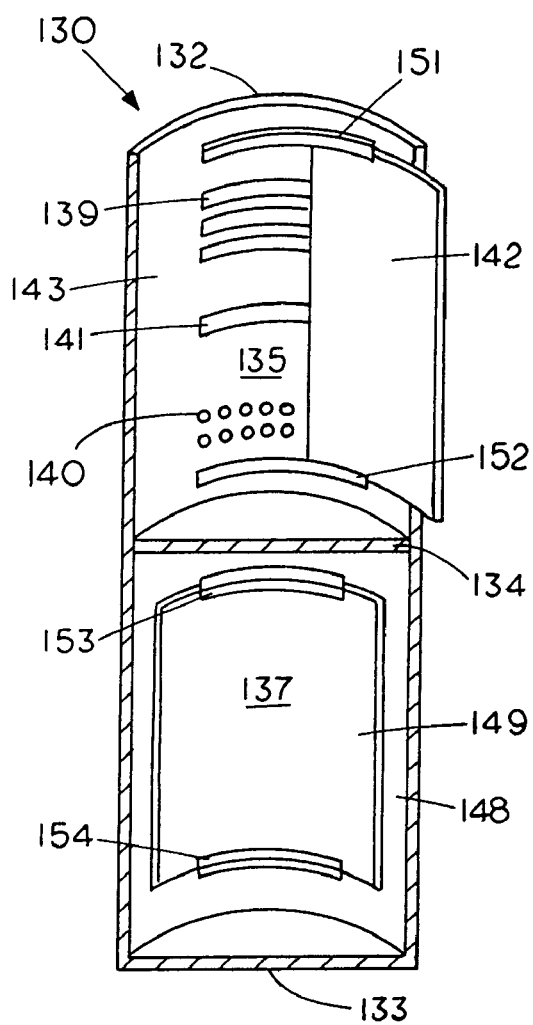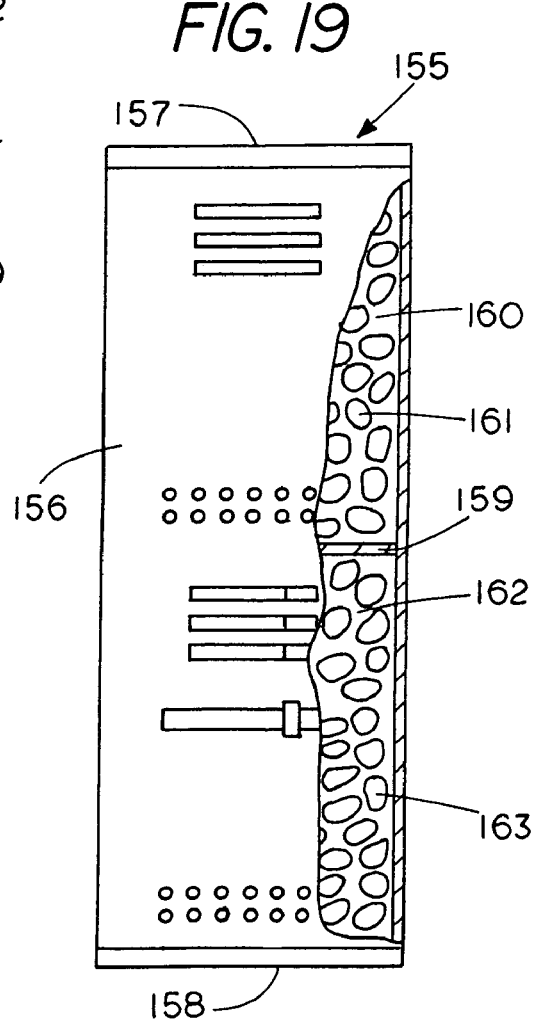

COMBINATION INLINE DISPENSER AND NON-FITTED CARTRIDGE

This application is a continuation of application Ser. No. 10/151,834, filed May 20, 2002, now U.S. Pat. No. 6,908,551, which is a continuation-in-part of Ser. No. 09/628,637, filed Jul. 31, 2000 now U.S. Pat. No. 6,500,334.

FIELD OF THE INVENTION

This invention relates generally to fluid treatment and, more specifically to an open flow path system, namely the combination of an inline dispenser having fluid ports which are normally directly mateable to the ports of a fitted cartridge with a non-fitted cartridge having ports that are not directly mated to the fluid ports of the inline dispenser. The present invention also comprises the method of replacing a "closed flow path system" wherein a fitted cartridge has ports directly mated to the fluid outlet port of an inline dispenser with an "open flow path system" wherein the cartridge is not fitted and the ports of the cartridge do not directly mate with the fluid ports of the inline dispenser.

STATEMENT REGARDING FEDERALLY SPONSORED RESEARCH OR DEVELOPMENT

None

REFERENCE TO A MICROFICHE APPENDIX

None

BACKGROUND OF THE INVENTION

Inline fluid dispensers typically comprise a housing having an internal chamber, a fluid outlet port and a fluid inlet port that are in direct fluid communication through a fitted cartridge containing a dispensing material therein.

In operation of an inline fluid dispenser, a fluid stream, which enters a dispenser valve inlet of the dispenser housing, is split into two parts, a main fluid stream that flows directly through the dispenser housing from the dispenser valve inlet to a dispenser valve outlet and a secondary fluid stream that is diverted through an internal chamber of the inline dispenser before exiting through the dispenser valve outlet.

The fitted cartridges for these inline dispensers have an interior chamber, which forms part of a closed path for the secondary fluid stream. That is, the secondary fluid stream is confined by the fitted cartridge and does not flow into the internal chamber of the housing. The use of a closed path through the fitted cartridge assures that fluid flows through the dispensing material in the fitted cartridge.

Located on one end of the fitted cartridge is an inlet port that is directly mateable to the fluid outlet port of the dispenser housing to thereby provide a direct and closed flow path for the secondary fluid stream to flow into the interior of the fitted cartridge. Located on the opposing end of the fitted cartridge is an outlet port that is directly mateable to the fluid inlet port of the dispenser housing to provide a direct and closed flow path for the secondary fluid stream to flow out of the fitted cartridge. Thus the mating between the ports of the inline dispensers to the ports of their fitted cartridges provide a "closed flow path" for directing the secondary fluid stream from the main fluid stream through the fitted cartridge. An example of an inline dispenser using a fitted cartridge with a closed path is shown in King U.S. Pat. No. 5,076,315.

A number of other inline dispensers are commercially available. Typically, these commercially available inline dispensers have different shapes and sizes. Although the commercially available inline dispenser use fitted cartridges to create a closed flow path, the different inline dispensers usually have different fluid ports locations and different cartridge connection points. As a result the fitted cartridge for each inline dispenser manufacturer is unique to that manufacturer's own dispenser. Consequently the fitted cartridge from one manufacturer is not capable of being used as a replacement cartridge in an inline dispenser produced by another manufacturer because each cartridge is specifically configured to connect to the manufacture's own inline dispenser.

The present invention comprises the combination of an inline dispenser and a non-fitted cartridge. The housing of the inline dispenser has a fluid outlet port for normally directly mating to an inlet port on a fitted cartridge and a fluid inlet port for normally directly mating to an outlet port on the fitted cartridge. However, the non-fitted cartridge used in the present invention has no ports for directly mating with either the fluid outlet port or the fluid inlet port of the inline dispenser. In addition, the non-fitted cartridge need occupy only a portion of the internal chamber of the inline dispenser housing. Consequently, the combination creates an open flow path between the fluid outlet port and the fluid inlet port of the inline dispenser.

Although inline dispensers have traditionally relied on directing a secondary stream along a closed path I have discovered that one can obtain proper dispensing even though the dispenser contains an open path system. More specifically, I have discovered that one can place a non-fitted cartridge with multiple ports in the inline dispenser housing and, even though an open flow path exists in the dispenser, one can still obtain the proper dispensing. The present invention comprises a combination of an inline dispenser and a non-fitted cartridge that form an open flow path through the inline dispenser. The discovery that open flow paths can be used in an inline dispenser allows one to use non-fitted cartridges in inline dispensers that normally use fitted cartridges.

The present invention also comprises the method of replacing a "closed path" in an inline dispenser system wherein a fitted cartridge has an inlet port directly mated to the fluid outlet port of an inline dispenser and has an outlet return port directly mated to the fluid inlet port of the inline dispenser with an "open path" wherein the cartridge ports do not directly mate with either the fluid outlet port or the fluid inlet port of the inline dispenser.

SUMMARY OF THE INVENTION

The present invention comprises the combination of an inline dispenser housing and a non-fitted cartridge. The dispenser housing has a fluid outlet port for normally directly mating to a fluid inlet port in a fitted cartridge and a fluid inlet port for normally directly mating to a fluid outlet port in the fitted cartridge to form a closed flow path. Located within the dispenser housing is a non-fitted universal cartridge containing a dispensable material. The non-fitted universal cartridge when placed in the chamber of the dispenser housing need not be mated with the ports of the dispenser housing but can be spaced from the fluid outlet port and fluid inlet port of the dispenser housing. In operation, the port or ports on the non-fitted universal cartridge form an open flow path with the fluid outlet port and fluid inlet port of the inline dispenser thus allowing the universal cartridge to be used in a number of different types of inline dispensers.

The present invention also comprises the method of replacing a closed flow path system wherein a fitted cartridge has an inlet port directly mated to the fluid outlet port of an inline dispenser and has an outlet port directly mated to the fluid inlet port of the inline dispenser with an open flow path system wherein the ports of a non-fitted universal cartridge do not directly mate with the fluid ports of the inline dispenser.

BRIEF DESCRIPTION OF THE DRAWINGS

FIG. 1 is a perspective view of a fitted cartridge use in an inline dispenser;

FIG. 2 shows an inline water purification dispenser with a fitted cartridge contain purification material connected thereto;

FIG. 16 shows a front view of a one-piece cylindrical shaped dual dispensing cartridge that can be used as the water purification container for applicant's combination inline dispenser and water purification material container;

FIG. 17 shows a partial cross-sectional view of the cylindrical shaped one-piece dual dispensing cartridge of FIG. 16;

FIG. 18 is a partial cross-sectional view showing the securement gates to the interior surface chambers of the cartridge of FIG. 16;

FIG. 19 is a partial cross-sectional view of a cylindrical shaped dual dispensing cartridge having one a first chamber with a fixed fluid flow and a second chamber having a variable fluid flow.

DESCRIPTION OF THE PREFERRED EMBODIMENT

Figure 7:
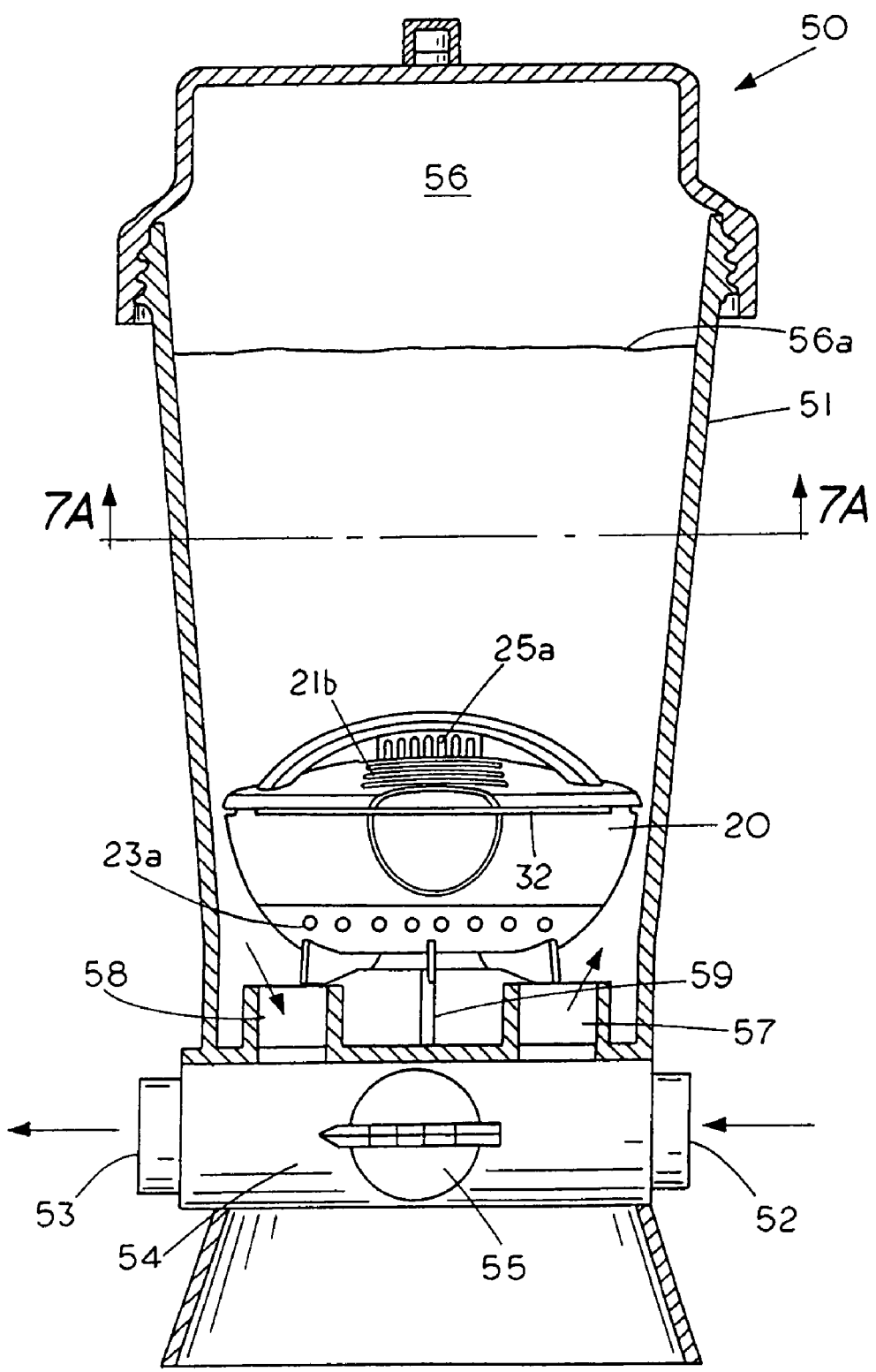
FIG. 7 shows the present invention comprising applicant's purification device and the inline dispenser of U.S. Pat. No. 5,076,315.
Figure 8:
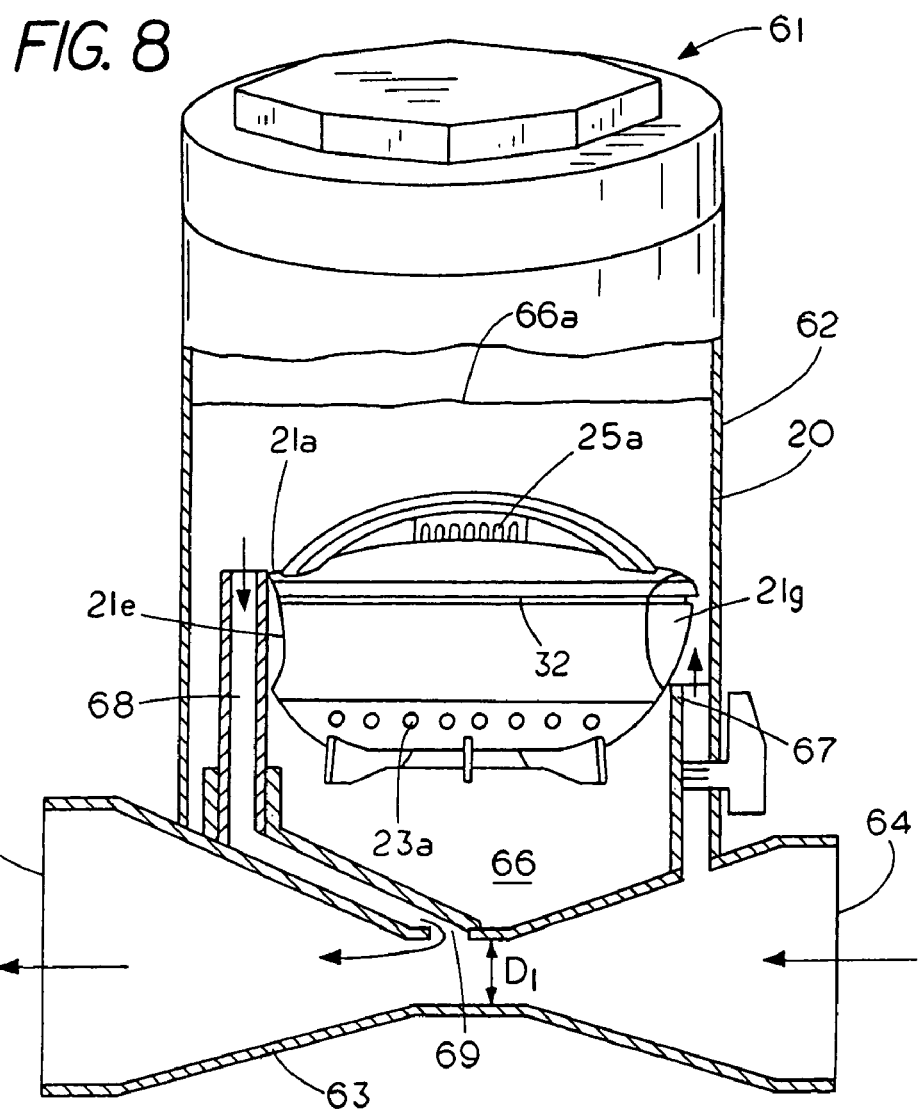
FIG. 8 shows the present invention comprising applicant's purification device and a dispenser having a fluid conduit tapering to a midpoint region on the conduit.
Figure 9:
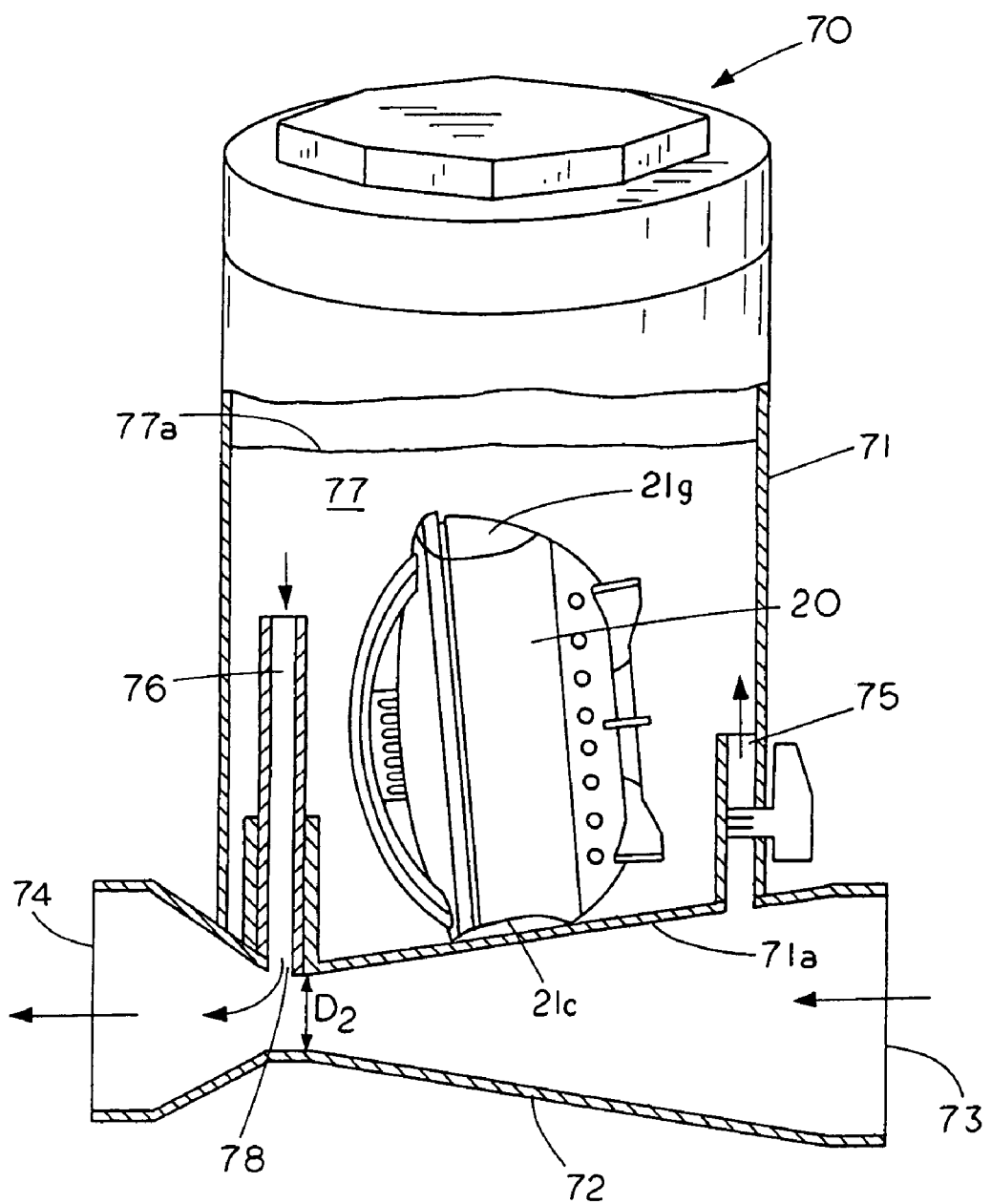
FIG. 9 is similar to FIG. 8 but with a fluid conduit of the dispenser tapering to a region on the conduit proximal to the fluid inlet port.
Figure 10:
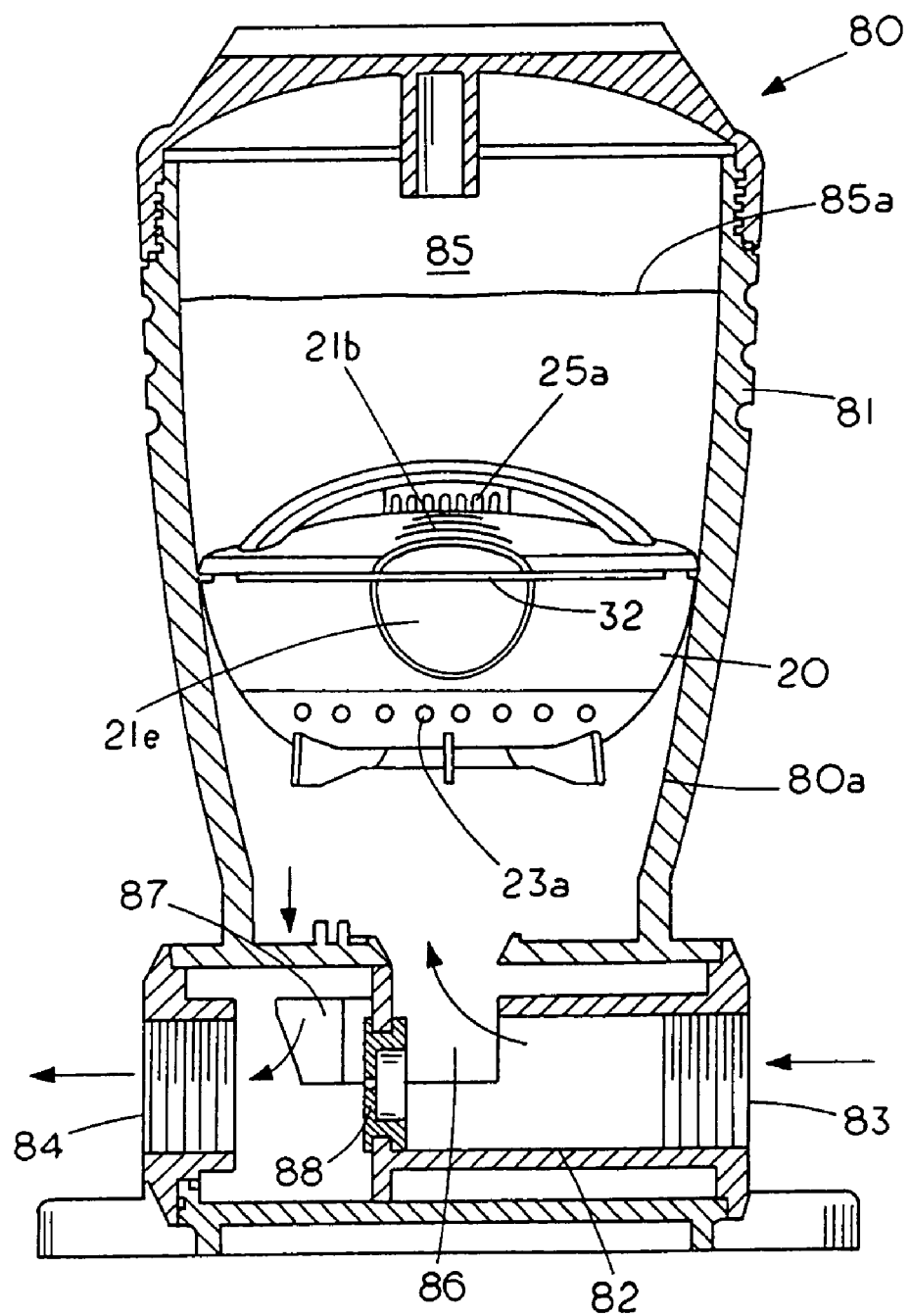
FIG. 10 shows the present invention comprising applicant's purification device and the dispenser of U.S. Pat. No. 5,660,802.

The present invention is a combination of an inline dispenser wherein a fitted cartridge therein has been replaced with a non-fitted cartridge to provide an open flow path system for dispensing water purification material. FIG. 7 shows an open flow path system comprising an inline water purification material dispenser housing 51 with a non-fitted cartridge 20 located therein. FIGS. 3-6 show a non-fitted cartridge 20 suitable for use in the present invention and FIGS. 8-10 show the non-fitted cartridge 20 located within different types of inline water purification material dispensers.

Prior art and commercially available closed path inline water purification material dispensers typically comprises an inline dispenser housing having an internal chamber for support of a fitted cartridge, a fitted cartridge containing a water purification material therein, and a fluid outlet port and a fluid inlet port that are in direct fluid communication through the ports of the fitted cartridge.

The fitted cartridges for these closed path inline dispensers generally have an interior chamber for holding a water purification material therein which forms part of a closed path for the secondary fluid stream. That is, in a closed path system the fitted cartridge confines the entire secondary fluid stream within the fitted cartridge. Located on one end of the fitted cartridge is a water inlet port directly mateable to the fluid outlet port of the dispenser housing to thereby provide for a direct and closed flow path for fluids to enter the interior of the fitted cartridge. Located on the other end of the fitted cartridge is a water outlet port directly mateable to the fluid inlet port of the dispenser housing to thereby provide for a direct and closed flow path for fluids to flow through the fitted cartridge. Examples of a closed path prior art inline dispenser using a fitted cartridge is shown in U.S. Pat. No. 5,076,315, which are incorporated herein, as FIGS. 1 and 2, to illustrate the closed path system.

FIG. 1 is a perspective view showing a fitted cartridge 10 for use in an inline water purification material dispenser 15 of FIG. 2. Fitted cartridge 10 is shown in FIG. 1 having a cartridge inlet port 11 and a cartridge outlet port 12 for directing a secondary fluid stream through the interior of the fitted cartridge for the dispensing of purification materials.

FIG. 2 is a cross-sectional view showing fitted cartridge 10 used in a water purification material inline dispenser 15. In FIG. 2, the mating between cartridge water inlet port 11 and fluid outlet port 13 of inline dispenser 15 provides for a direct and closed flow path for the entire fluid stream to flow into fitted cartridge 10 and flow through a water purification material 16 located within fitted cartridge 10. As the fluid stream flows through fitted cartridge 10, purification material 16 is released into the fluid stream and is carried out of fitted cartridge 10 through the direct closed flow path created by the mating between cartridge water outlet port 12 and fluid inlet port 14 of inline dispenser 15. Since the mating between the fluid ports of inline dispenser 15 and cartridge water inlet port 11 and cartridge water outlet port 12 provides for a direct closed flow path into and out from fitted cartridge 10, the entire secondary fluid stream must flow through fitted cartridge 10.

As shown in FIG. 2, the mating between cartridge inlet port 11 and fluid outlet port 13 and cartridge outlet port 12 and fluid inlet port 14 also provides fixed support for retaining fitted cartridge 10 in position within internal chamber 15a.

Figure 3:
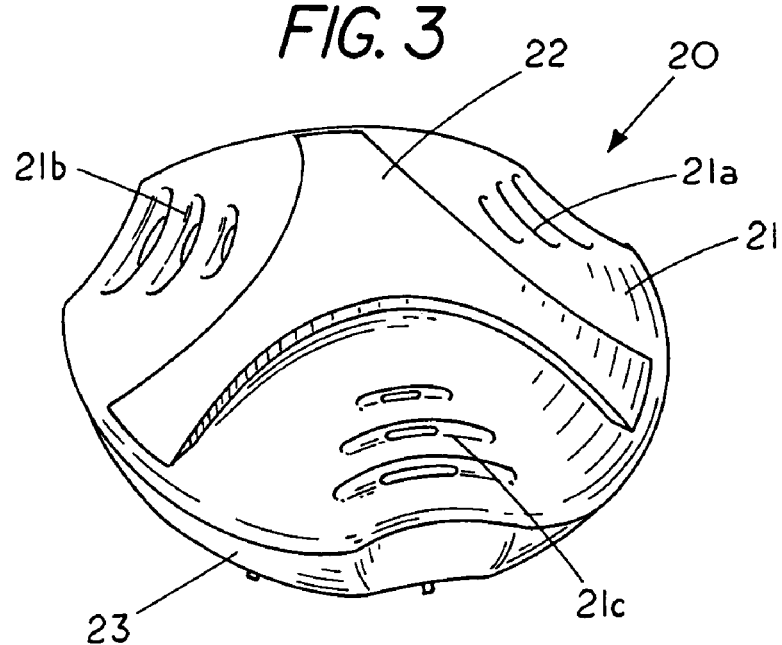
FIG. 3 is a perspective view of the water purification device for use in the present invention.

FIG. 3 is a perspective view of a water purification material container, having no ports for directly mating to the fluid ports of the inline dispenser. The embodiment of FIG. 3 can be used as the water purification material container for applicant's combination inline dispenser and water purification material container.

The water purification device 20 illustrated in FIGS. 3-6 is shown and described in my co-pending application Ser. No. 09/628,637; titled STAND ALONE WATER PURIFIER; filed Jul. 31, 2000, which is incorporated herein by reference. It has been found that even though the water purification material container of FIG. 3 has no ports to directly mate with the fluid ports of an inline dispenser, it can be used within an inline dispenser as part of applicant's open path system. The water purification material container of FIG. 3 comprises a water purification device 20 with water purification device 20 having a general spherical shape with a cover 22, which is also suitable for use as a handle for removing and replacing the water purification device 20 from an interior chamber of a housing when the water purification material is spent. That is, cover 22 is spaced sufficiently far from a shroud 21 so that a user can insert his or her fingers beneath the cover 22 to lift the water purification device 20 from the inline dispenser. The water purification device 20 is suitable for use in flow conditions where debris can be present.

Shroud 21 extends radially outward to extend circumferentially over a container 23 located thereunder. Shroud 21 includes a first set of shroud water inlets 21a, a second set of shroud water inlets 21b and a third set of shroud water inlets 21c for directing water into container 23. Each of the individual water shroud inlets have an arcuate shape and each of the water inlets includes at least three water inlet ports with the apex of each of the arcuate shroud water inlets located at the highest vertical position of the shroud inlet. The shroud inlets together with the shroud as will be described herein provide for flushing debris away from the shroud inlets when the purification device 20 is placed in a debris environment.

Figure 4:
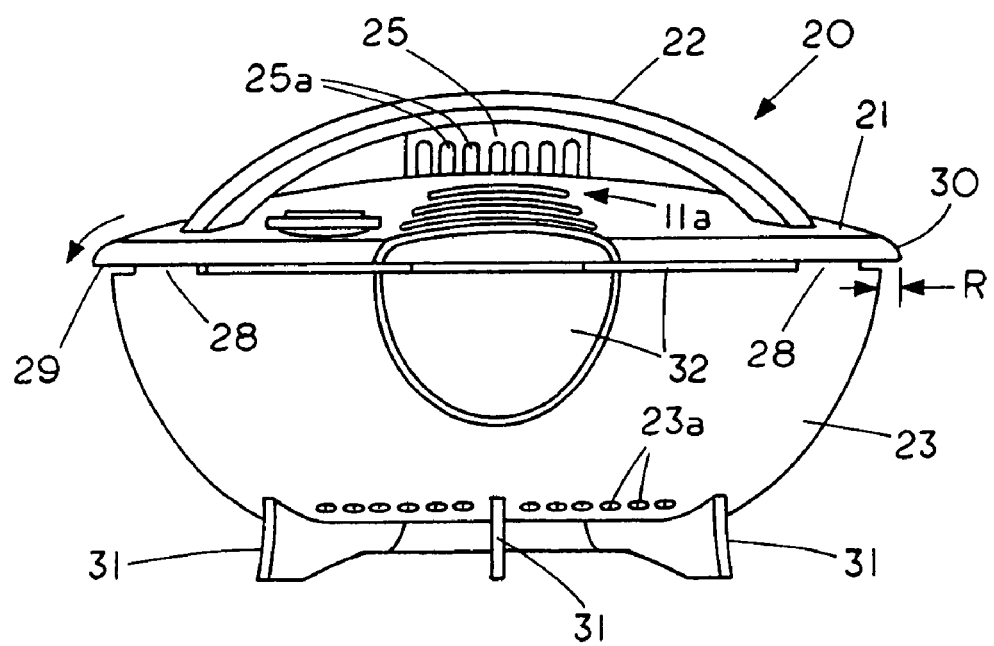
FIG. 4 is a front view of the water purification device shown in FIG. 3.

FIG. 4 is a front view of the water purification device 20, showing shroud 21 extending radially outward over container 23 at a distance denoted by R. Shroud 21 forms a lateral top shield for a circumferential water inlet 32 formed between container 23 and cover 22. That is, a set of tabs 28 connect and hold shroud 21 in a spaced condition from container 23 so that water can flow laterally in the circumferential inlet 32 located around the periphery of water purification device 20. The purpose of having shroud 21 extend beyond the periphery of container 23 is to enable the shroud to carry water and debris that impinges normally on water purification device 20 to be carried past the lateral shielded water inlets 32. The arrow indicates the direction of water flow as the water flows over circumferential edge 30 of the shroud 21. However, since the water itself will tend to be drawn backward to the underside 29 of shroud 21 by the Coanda effect, water will be directed laterally inward into container 23 though inlet 32. Consequently, for debris to enter circumferential inlet 32 would require that the debris make an abrupt change in direction to flow into the circumferential inlet. Consequently, the momentum of the debris causes it to separate from the flow of water and be carried past circumferential inlet 32. Thus circumferential water inlets 32 provide one path for ingress of water into water purification device 20 while inhibiting debris from entering therein.

Figure 5:
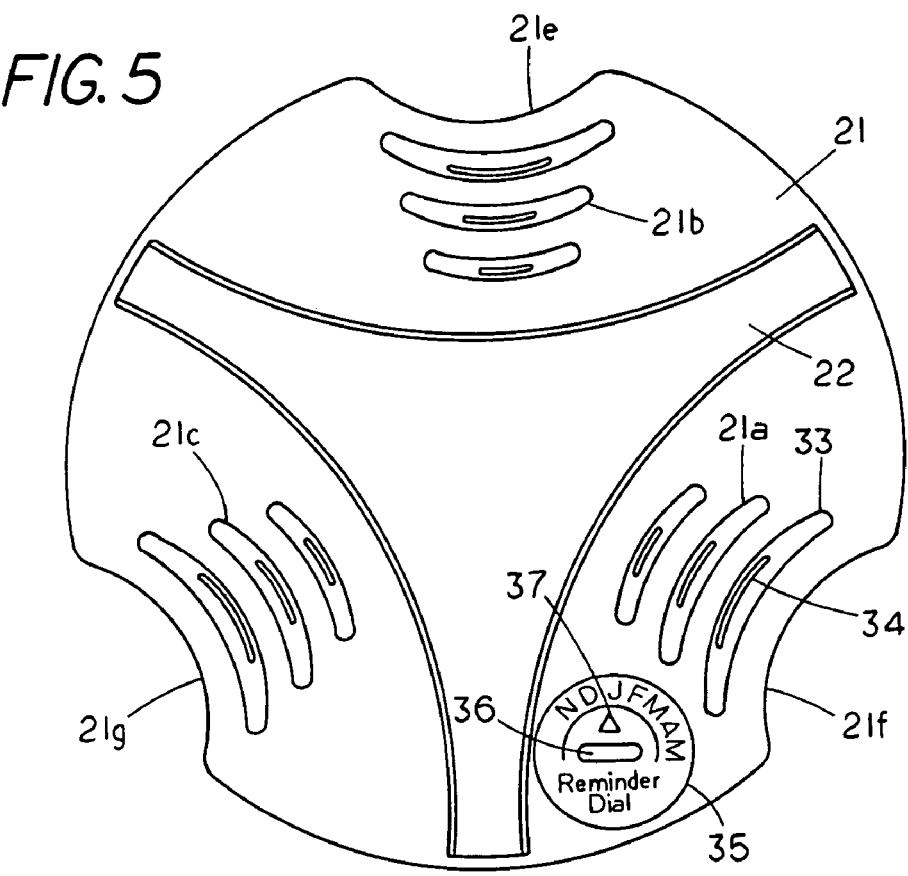
FIG. 5 is a top view of the water purification device shown of FIG. 3.

Located on the top portion of water purification device 20 is a cylindrical extension 25 that extends vertically upward from shroud 21 to the underside of cover 22. FIG. 5 illustrates that cylindrical extension 25 is shield by cover 21. Locate within cylindrical extension 25 is a set of circumferentially spaced elongated slots 25a that communicate with an interior chamber of water purification device 20. Elongated slots 25a provide a primary water inlet of water into the water purification device 20 while the cover 22 shields the water inlets from clogging with debris by extending laterally past the elongated openings to thereby inhibit debris from entering water inlets 25a.

FIG. 5 is a top view of the water purification device 20 showing cover 22 with portions of cover 22 extending radially outward in three different directions. The cover 22 completely shields the water inlet 25a (FIG. 4) from the normal flow direction. It is noted that the set of shroud water inlets 21a, 21b and 21c are not shielded by cover 22 but are spaced radially outward on shroud 21 with each of the water inlets having a curved recess that surrounds the port therein. For purposes of description only one of the shroud ports and inlets will be described however, the others have similar shapes. Reference numeral 33 identifies an arcuate shaped recess 33 with an arcuate shaped port 34 positioned centrally therein at the bottom of the arcuate shaped recess 33. The purpose of having the recess 33 located below the plane of the shroud is so that any debris that might block the port 34 would not be able to come into direct contact with port 34 thereby allowing a continuing flow of water to channel or wash any debris off the smooth dome shape of shroud 21.

While flow is directed over the surface of the dome shaped shroud 21 there are included a set of scallops for funneling the water around the water purification device 20. As each of the scallops is identical only one will be described herein. A scallop 21f is located in water purification device 20 to provide a larger area for water to flow past the shroud. As a result water tends to funnel laterally into the scallop 21f and over the recessed areas of the shroud inlets thereby producing a washing action over the set of shroud water inlets 21a to thereby inhibit debris in the water from blocking or obstructing the shroud water inlets 21a, 21b and 21c. It is apparent that in the present invention each of the water inlets include either an obstruction or a flow diverter to inhibit debris from blocking the water inlets.

Located on the top side of water purification device 20 is a reminder dial that contains an outer section listing symbols that correspond to the month of the year and an interior rotatable dial 36 that can be rotated so that pointer 37 points to the month that the water purification device 20 should be replaced.

Figure 6:
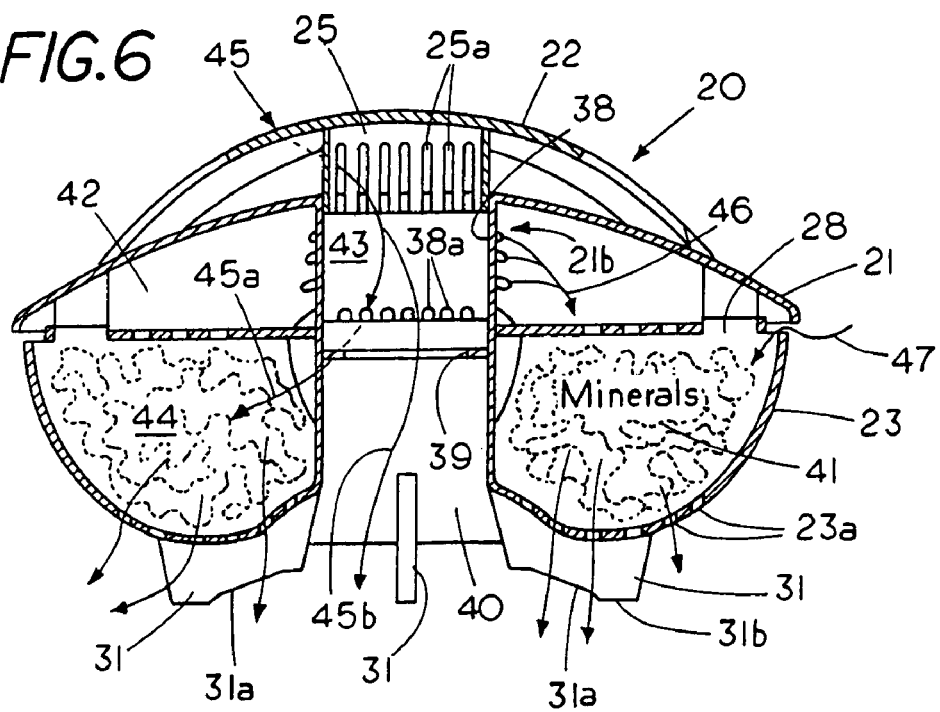
FIG. 6 is a cross-sectional view of the water purification device of FIG. 3.

FIG. 6 shows a cross sectional view of water purification device 20 with flow arrows indicating the multiple separate flows of water through the water purification device 20 if flow enters from the top. Located within the interior of water purification device 20 is a water passage 38 that extends centrally through water purification device 20 with the elongated slots 25a being in fluid communication with water passage 38. Extending circumferentially around passage 38 are a set of circumferential water inlets 38a that direct water radially outward from passage 38 into an annular chamber 42 wherein water flows thorough water purification material 41 located in an annular compartment 44 within container 23. In the present embodiment of purification device 20, the water purification material 41 includes a silver ion generating material. In addition zinc or other metals could be used and if desired limestone can be used to maintain the pH of the water. Purification device 20, as shown, is well suited for the mineral type dispensers as the minerals can be shielded and protected from debris contamination.

Passage 38 includes a restriction 39 that comprises a radial restriction in flow area through passage 38. The purpose of restriction 39 is to increase the resistance to water flow through passage 43 thus creating a back pressure in region 43 in fluid passage 38 which causes water to flow laterally and radially outward through water inlet 38a and into the water purification material 41. The amount of restriction can be adjusted to maintain the proper flow through the water purification device by increasing or decreasing the diameter of the opening therein. It will be evident that the water flowing though inlet 25a has two routes, a first route straight through the water purification device 20 without contacting the minerals 41 and a second route through the water purification minerals 41.

To illustrate the multiple flow paths of water through the water purification device 20 references should be made to FIG. 6, which shows a water flow arrow 45. Water flows through primary water inlet 25a and into central chamber 43 in water passage 38. A portion of the water flow is delivered into minerals 41 as indicated by arrow 45a and a further portion, indicated by arrow 45b, flows directly through passage 42 without coming into contact with the water purification materials 41. Thus a portion of the primary flow of water that enters the top of the water purification device flows directly through the water purification device without contacting the water purification materials while a further portion is brought into contact with the water purification materials 41.

Referring again to FIG. 6, a second flow path of water into chamber 42 through inlets 21b is indicated by arrow 46. This portion of water flows downward into minerals 41 without any of the water stream being directed away from the water purification material.

FIG. 6 shows a third source of water flowing into container 23 through the circumferential passage 22 which extends between container 23 and shroud 21. Arrow 47 indicates the direction of flow of water through passage 22 directly into the minerals 41. In each case the water flows through the minerals 41 and is discharged from the container 23 through water outlets 23a located at the lower portion of container 23 as indicated by the arrows extending through outlets 23a. Thus in operation of the invention water can be directed through any of the three set of water inlets with two of the water inlets including either a cover to prevent direct flow of water into the water inlets and the third water inlet having a recess with an arcuate shape that allow water to be funneled toward the inlet and thereby wash off any debris that may have a tendency to block entry. From the above description it is apparent that in operation two of the three water inlets direct all the water into the minerals 41 while the third inlet directs only a portion of the water into the water purification materials.

While only one set of water inlets could be used to direct water through water purification device 20, the use of multiple water inlets each of which have some type of mechanism for maintaining the water inlet in a debris free condition greatly enhances the chances of at least some of the water inlets being maintained in an open condition so that water can be continually purified as water flows through the water purification device 20. Thus the water purification device continues to provide enhanced water purification characteristics even though some of the water inlets may become blocked with debris.

Water purification device 20 is well suited for placement in a fluid stream where debris can be present since the cover 22 and shroud 21 can be used to shield a portion of the ports and thus prevent blockage of the ports. To inhibit blockage of ports when debris is present the fluid is directed toward the cover 22 and shroud 21. However, if no debris is present then flow can proceed through the container 20 in any direction and the container need not be oriented as to shield the inlet ports from debris. That is, fluid flow could enter normal outlet ports 23a and discharge through inlet ports located in the purification device 20. The multi-directional flow feature in debris free water makes purification device 20 suitable for use in either systems that carry debris or systems or portions of systems that are free of debris. A typical portion of a system that is maintained free of debris through filters or screens is the portion of the system that carries the inline dispenser since the water must flow through a constricted path in the dispenser housing in order to separate a portion of the stream from the main stream.

Although purification device 20 is usable in either a debris laden water or water free of debris a feature of purification device 20 which one would assume makes it unsuitable for use in a closed path system of an inline dispenser is that the ports in water purification device 20 do not contain extensions for directly mating with other portions of a closed path system. As previously pointed out the inline dispensers typically divert a portion of a stream directly through the ports of a fitted cartridge placeable in a chamber within the inline dispenser. The purpose of purification device 20 is to provide a housing for confining a water purification material therein and fluid ports for ingress and egress through the housing so that fluid can come into contact with the water purification material therein. It has been found that even though purification device 20 contains no mating ports it can be inserted into a portion of the chamber of inline dispenser housing thereby converting a closed path system to an open path system wherein water is free to flow either through or around purification device 20. Although water is free to flow either around or through purification device 20 which occupies only a portion of the chamber in an inline dispenser housing it has been found that one can controllably release water purification material thereby rendering it unnecessary to use a cartridge that mates the ports of the purification device 20 directly to the ports of the inline dispersal valve.

FIGS. 7, 8, 9, and 10 show examples of applicant's open path dispensing system comprising different types of inline water dispensers supporting a non-fitted cartridge containing water purification material therein. Each of the inline water purification material dispenser housing of FIGS. 7, 8, 9, and 10 are commercially available and have fluid ports for directly mating to the water ports on a fitted cartridge (not shown). Unlike the prior art inline dispensers that have ports that are mated with a fitted cartridge to form a closed flow path for the dispensing of water purification material, applicant's system as shown in FIGS. 7, 8, 9, and 10, uses an inline dispenser and water purification material device 20 to provide for an open flow path system. That is, in an open flow path system the water purification material device 20 is not directly connected to the fluid ports of the inline dispenser to dispense proper purification material. Instead, while in use within the inline dispenser housing, the water inlet and water outlet of the water purification material container of applicant's invention are actually spaced from the fluid ports of the inline dispenser to form an open flow path.

The commercially available inline water purification material dispenser housing useable in applicant's invention are the inline dispenser housings that have a fluid outlet port and a fluid inlet port that directly mate to a fitted cartridge for directing a secondary fluid stream through an interior chamber of the dispenser housing. A characteristic of these inline dispensers is that they separate a fluid stream into two separate streams, a first stream that flows directly through the housing and a secondary stream that flows through a fitted cartridge through a close flow path, i.e. the water inlet port of the fitted cartridge is directly mated to fluid outlet port of the inline dispenser and the water outlet port of the fitted cartridge is directly mated to fluid inlet port of the inline dispenser to provide for a direct closed flow path for water to flow through the fitted cartridge. In addition, the interior chamber of the dispenser housing is sufficiently large to fixedly support a non-fitted cartridge therein to maintain the ports in engagement with each other. Examples of inline dispenser housings capable of being used as the inline dispenser housing in applicant's open path system can be found in the inline dispenser housing of FIGS. 2 and 7-10.

Inline dispenser housing for directing a secondary fluid stream through a fitted cartridge in a close path are commercially available from manufactures such as King Technology of Hopkins, Minn.; Hayward Pool Products, Inc. of Elizabeth, N.J.; Olympic Pool Accessories of Montreal, Quebec, Canada; and Zodiac Pool Care, Inc. of Ft. Lauderdale, Fla. and Pentair Pool Products of Sanford, N.C.

In regards to the water purification material container for use in applicant open path system, the water purification material container for applicant's invention can comprise a variety of embodiments which do not have ports to directly mate with the fluid ports of the inline dispenser housing. Thus various size and shapes of containers are useable but the water purification material container should be sufficiently small to be placeable within the interior chamber of the inline dispenser housing, without blocking the ports of the inline dispenser housing. In general, fitted cartridges used in prior art inline dispensers generally fill the entire interior chamber of the inline dispenser in order to hold the cartridge in position, whereas the water purification material container for applicant's invention need not be held in a fixed condition, the purification material container need to encompass only a portion of the interior chamber of the inline dispenser. The use of a portion of the chamber can allow fluids to linger within the internal housing of the inline dispenser; however, it does not prevent dispersion of material into the fluid stream. That is, with an open path flow system in an inline dispenser the secondary fluid is not confined to a single flow path, yet one can dispenser materials into the fluid stream.

Although water purification containers such as water purification device 20 of FIGS. 3-6 are shown with multiple ports, the water purification material container for use in applicant's inline open path system could have one opening that can be used both as the fluid inlet and fluid outlet of the container or could have a plurality of openings with a first portion of the plurality of openings comprising the fluid inlet of the container and a second portion of the plurality of openings comprising the fluid outlet of the container. Alternatively, instead of having openings, the water purification material container useable in the open flow path system could comprise water permeable walls capable of maintaining water purification material in solid form within the container while allowing for the flow of fluid and dissolved water purification material therethrough.

Referring to FIGS. 7-10, in the general operation of applicant's open path system that uses in combination an inline dispenser and a non-fitted water purification material container such as purification device 20, a fluid stream entering a dispenser valve inlet of the dispenser housing is split into two parts. The first part is the main fluid stream that flows directly through the dispenser housing from the dispenser inlet valve to a dispenser outlet valve and the second part is a secondary fluid stream that is diverted through the fluid outlet port of the dispenser housing and into the internal chamber of the inline dispenser housing. Once through the fluid outlet port the secondary fluid stream flows into the internal chamber of the inline dispenser and can linger therein before the secondary fluid stream is directed out of the internal chamber of the inline dispenser and back into the main fluid stream through the fluid inlet port of the inline dispenser.

As the secondary fluid stream can linger and flow within the internal chamber of the housing a portion of the secondary fluid stream flows through purification device 20 through ports 21b, 23a, 25a and 32 of purification device 20. While the secondary stream is in the interior of the water purification material container, purification materials located therein are released into the fluid stream. The water purification materials are then carried by the secondary fluid stream from the internal chamber of the dispenser back into the main fluid stream through the fluid inlet port of the inline dispenser housing.

FIGS. 7, 8, 9, and 10 all show the applicant's open path system with various inline water dispensers and water purification device 20. The inline dispensers of FIGS. 7, 8, 9, and 10 are all designed to be use with their own specifically fitted cartridges to form a close flow path system. In addition, the inline dispensers of FIGS. 7, 8, 9, and 10 all have fluid ports located within their internal chambers for mating directly to the ports of their fitted cartridges to provide for a direct closed flow path for the flow of a secondary fluid stream into and out from the interior of their fitted cartridges.

FIG. 7 is a partial cross-sectional view showing applicant's open path system comprising water purification device 20 and an inline dispenser 50. Inline dispenser 50 is further disclosed in U.S. Pat. No. 5,076,315 and is manufactured and sold by King Technology, Inc., located in Hopkins, Minn. As shown, inline dispenser 50 includes a housing 51. Located within housing 51 is an internal chamber 56, which is capable of supporting water purification device 20 freely therein. The lower portion of internal chamber 56 includes a fluid outlet port 57 for directing a secondary stream of fluid into internal chamber 56 and a fluid inlet port 58 for directing a secondary fluid stream out of internal chamber 56.

In the normal operation of inline dispenser 50 with a fitted cartridge (not shown), a main fluid stream is directed into dispenser 50 through a dispenser valve inlet 52 at a first fluid velocity, and moves through a fluid conduit 54 and exits dispenser 50 by way of a dispenser valve outlet 53. As the main fluid stream moves through conduit 54, a fluid outlet port 57 directs a secondary fluid stream originating from the main fluid stream axially upward into a fitted cartridge (not shown) located within the internal chamber 56 through the direct closed flow path formed by the mating between a water inlet port of the fitted cartridge and fluid outlet port 57 of dispenser 50. Once in the fitted cartridge (not shown) a fluid inlet port 58 of the inline dispenser directs the secondary fluid stream axially downward from the fitted cartridge back into the main fluid stream through the direct closed flow path formed by the mating between the fitted cartridge outlet port (not shown) and fluid inlet port 58 of dispenser 50. As the secondary fluid stream flows through the fitted cartridge, purification materials are released into the secondary fluid stream for water purification.

Introducing the secondary fluid stream containing water purification material back into the main fluid stream results in the main fluid stream exiting dispenser 50 through dispenser valve outlet 53 at a second fluid velocity.

Referring to FIG. 7, note that unlike the use of the prior art fitted cartridges with inline dispenser 50, which requires that the fitted cartridge be directly mated to inline dispenser 50, applicant's water purification device 20 is shown in FIG. 7 is freely located within internal chamber 56 of inline dispenser 50 with ports 21b, 23a, 25a, and 32 of water purification device 20 all spaced from the fluid ports 57 and 58 of inline dispenser 50 to thereby form an open flow system. The open flow path permits the secondary fluid stream to linger within internal chamber 56 so that water purification device 20 can dispenser proper purification material into the secondary fluid stream before the secondary fluid stream is directed from internal chamber 56 back into the main fluid stream through fluid inlet port 58. Since water purification device 20 does not require water inlets 21b, 25a, and 32 and outlets 23a be directly connected to or engaging the fluid ports of inline dispenser 50 in order for water purification device 20 to dispense proper purification material, applicant's combination inline dispenser 50 and water purification device 20 that forms an open flow path through the inline dispenser allows one to use water purification device 20 in inline dispenser 50 which normally uses a fitted cartridge thus providing a universal water purification device.

FIG. 7 illustrates that water purification device 20 need not be confined or secured to inline dispenser 20 but instead can be "free standing" within the internal chamber of the dispenser housing 51, water purification device 20 is shown in FIG. 7 supported within inline dispenser 50 by the interior wall surfaces of housing 51, instead of by the fluid ports as shown in FIGS. 3 and 4. Inline dispenser 50 also includes a flange 59 for further supporting water purification device 20 within internal chamber 56. Both the flange 59 and the fluid ports 57 and 58 are integral components of the inline dispenser 50.

In the operation of inline dispenser 50 with water purification device 20, purification device 20 occupies a portion of the internal chamber 56 of the inline dispenser housing 51 with water purification device 20 dimensioned such that water purification device 20 cannot block the fluid outlet port 57 of dispenser 50 and preclude fluid flow through internal chamber 56.

A main fluid stream is directed into dispenser 50 through a dispenser valve inlet 52 at a first fluid velocity, and moves through a fluid conduit 54 (indicated by arrows) and exits dispenser 50 by way of a dispenser valve outlet 53. As the main fluid stream moves through conduit 54, fluid outlet port 57 directs a secondary fluid stream originating from the main fluid stream axially upward into internal chamber 56. Since water purification device 20 has no ports to mate with the fluid ports of inline dispenser 50, there is no direct path for the secondary fluid stream to flow from the fluid outlet port of the dispenser 50 to water purification device 20. As a result, the secondary fluid stream takes a non-direct path to the water purification device 20 by first flowing into internal chamber 56, thereby filling the internal chamber 56 of inline dispenser 50 with fluids. In spite of the lack of a direct path I have found that I can properly dispenser water purification materials into the system through an open path system.

In the embodiment of FIG. 7, as the fluid outlet port 57 continues to direct the secondary fluid stream upward into the internal chamber 56, a fluid level within the internal chamber 56, denoted by a fluid or water line 56a, will increase. When the fluid level within the internal chamber 56 of inline dispenser 50 reaches to a level where the inlets 21b, 25a, and 32 of the water purification device 20 are below the fluid line 56a, a portion of the secondary fluid stream is permitted to enter through water purification device 20 by water ports 21b, 23a, 25a, and 32 of water purification device 20 to thereby allow for the proper dispensing of water purification materials.

A fluid inlet port 58 then directs the secondary fluid stream axially downward from the internal chamber 56 back into the main fluid stream. The movement of the secondary fluid stream back into the main fluid stream results in the main fluid stream exiting dispenser 50 through dispenser valve outlet 53 at a second fluid velocity.

Figure 7A:
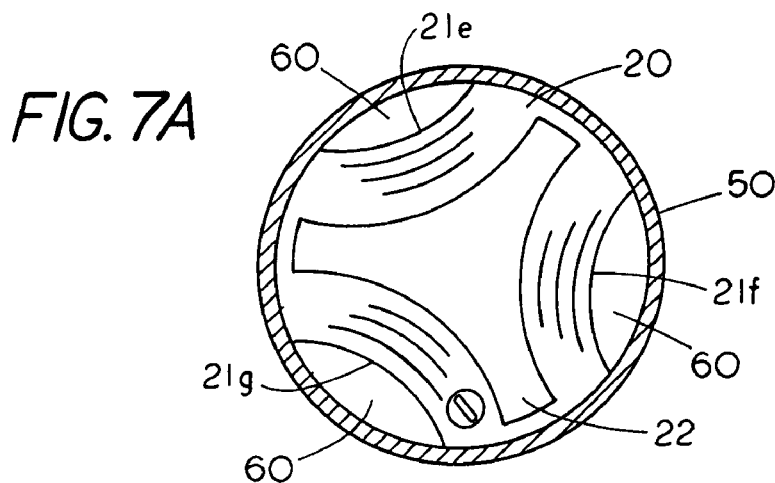
FIG. 7A is a cross-sectional view of FIG. 7 taken along the lines 7A-7A.

FIG. 7A is a cross-sectional view taken along the lines 7A-7A of FIG. 7 showing water purification device 20 circumferentially supported within inline dispenser 50 by the interior wall surfaces of inline dispenser 50. As shown, water purification device 20 includes scallops 21e, 21f, and 21g located on the side of water purification device 20. When water purification device 20 is circumferentially supported within internal chamber 56 by the interior wall surfaces of inline dispenser 50, scallops 21e, 21f, and 21g engages with the interior wall surfaces of inline dispenser 50 to form openings 60 allowing for water to flow therethrough. Also shown in FIG. 7A is cover 22 of water purification device 20, which as previously discussed, may alternatively be used as a handle for removing and inserting water purification device 20 into and out of inline dispenser 50.

FIG. 8 is a partial cross-sectional view showing an alternative embodiment of applicant's open path system comprising water purification device 20 and an inline dispenser 61. Inline dispenser 61 is manufactured by Hayward Pool Products, Inc., located in Elizabeth, N.J. As shown, inline dispenser 61 includes a housing 62. Located within housing 62 is an internal chamber 66, which is capable of supporting water purification device 20 freely therein. The lower portion of internal chamber 66 includes a fluid outlet port 67 for directing a secondary fluid stream into internal chamber 66 and a fluid inlet port 68 for directing a secondary fluid stream out of internal chamber 66. Inline dispenser 61 also includes a fluid conduit 63 tapering from a dispenser valve inlet 64 and a dispenser valve outlet 65 to proximate the midpoint region between valve inlet 64 and valve outlet 65 such that the smallest internal diameter, D1, of fluid conduit 63 is located within the midpoint region between valve inlet 64 and valve outlet 65.

In the normal operation of dispenser 61 using a fitted cartridge (not shown), a main fluid stream is directed into dispenser 61 through dispenser valve inlet 64 at a first fluid velocity, moves through a fluid conduit 63 and exits dispenser 61 by way of dispenser valve outlet 65.

As the main fluid stream moves through conduit 63, the fluid outlet port 67 of dispenser 61 directs a secondary fluid stream originating from the main fluid stream axially upwards into the fitted cartridge (not shown) through the closed flow path created by the mating between a water inlet port of fitted cartridge (not shown) and fluid outlet port 67 of inline dispenser 61. Once in the fitted cartridge (not shown) the fluid inlet port 68 of inline dispenser 61 then directs the secondary fluid stream axially downward from the fitted cartridge (not shown) through the direct closed flow path formed by the mating between the water outlet port of the fitted cartridge (not shown) and the fluid inlet port 68 of inline dispenser 61 and back into the main fluid stream through a conduit orifice 69 located within the midpoint region of fluid conduit 63, which is the region of fluid conduit 63 having the smallest internal diameter. As the secondary fluid stream flows through the fitted cartridge (not shown), water purification materials are released into the secondary fluid stream for water purification. Introducing the secondary fluid stream back into the main fluid stream results in the main fluid stream exiting dispenser 61 through dispenser valve outlet 65 at a second fluid velocity.

Referring to FIG. 8, unlike the use of a fitted cartridge with inline dispenser 61 which requires that the fitted cartridge be directly mated to dispenser 61, applicant's non-fitted water purification device 20 is shown located within internal chamber 66 of inline dispenser 60 with ports 21*b*, 23*a*, 25*a*, and 32 of water purification device 20 all spaced from the fluid ports 67 and 68 of inline dispenser 61 to thereby form an open flow system. The open flow path permits the secondary fluid stream to linger within internal chamber 66 so that water purification device 20 can dispenser proper purification material into the secondary fluid stream before the secondary fluid stream is directed from internal chamber 66 back into the main fluid stream. Since water purification device 20 does not require water inlets 21*b*, 25*a*, and 32 and outlets 23*a* be directly connected to or engaging the fluid ports of inline dispenser 61 in order for water purification device 20 to dispense proper purification material, applicant's combination inline dispenser 61 and water purification device 20 that forms an open flow path through the inline dispenser allows one to use water purification device 20 in inline dispenser 61 which normally uses a fitted cartridge.

In addition, unlike the use of the fitted cartridge with inline dispenser 61, water purification device 20 also need not be confined or secured to inline dispenser 61 but instead can be "free standing" within the internal chamber of the dispenser housing 51. Alternatively, water purification device 20 can be placed between the fluid ports of inline dispenser 61 as shown in FIG. 8.

In the operation of dispenser 61 with water purification device 20 as shown in FIG. 8, purification device 20 is shown occupying a portion of the internal chamber 66 of the inline dispenser housing 61 with water purification device 20 dimensioned such that water purification device 20 cannot block the fluid outlet port 67 of dispenser 61 and preclude fluid flow through internal chamber 66.

A main fluid stream is directed into dispenser 61 through a dispenser valve inlet 64 at a first fluid velocity, and moves through a fluid conduit 63 and exits dispenser 61 by way of a dispenser valve outlet 65. As the main fluid stream moves through conduit 63, fluid outlet port 67 directs a secondary fluid stream originating from the main fluid stream axially upward into the internal chamber 66 of the inline dispenser 61. Since the water purification device 20 has no ports to mate with the fluid ports of inline dispenser 61, there is no direct path for the secondary fluid stream to flow from the fluid outlet port 67 of the dispenser 61 to water purification device 20. As a result, the secondary fluid stream takes a non-direct path to the water purification device 20 by first flowing into internal chamber 66, thereby filling the internal chamber 66 of inline dispenser 61 with fluids up to the fluidline or waterline 66*a*. As the fluid outlet port 67 directs the secondary fluid stream into internal chamber 66 the fluid inlet port 68 directs the secondary fluid stream axially downward from the internal chamber 66 of the inline dispenser 61 and back into the main fluid stream through conduit orifice 69 located within the midpoint region of fluid conduit 63. Introducing the secondary fluid stream back into the main fluid stream results in the main fluid stream exiting dispenser 61 through dispenser valve outlet 65.

In FIG. 8, as the fluid outlet port 67 continues to direct the secondary fluid stream upward into the internal chamber 66, a fluid level within the internal chamber 66, denoted by a fluid line 66*a*, will increase. When the fluid level within the internal chamber 66 of inline dispenser 61 reaches to a level where the inlets 21*b*, 25*a*, and 32 of the water purification device 20 are below the fluid line 66*a*, a portion of the secondary fluid stream is directed through water purification device 20 by water ports 21*b*, 23*a*, 25*a*, and 32 of water purification device 20 to thereby allow for the proper dispensing of water purification materials.

FIGS. 9 shows an alternative embodiment of applicant's open path system comprising water purification device 20 and a different inline dispenser 70. Inline dispenser 70 is manufactured by Olympic Pool Accessories, located in Montreal, Quebec, Canada. As shown in FIG. 9, inline dispenser 70 includes a housing 71. Located within housing 71 is an internal chamber 77, which is capable of supporting water purification device 20 freely therein. The lower portion of internal chamber 77 includes a fluid outlet port 75 for directing a secondary fluid stream into internal chamber 77 and a fluid inlet port 76 for directing a secondary fluid stream out of internal chamber 77. Inline dispenser 70 also includes a fluid conduit 72 tapering from a dispenser valve inlet 73 and a dispenser valve outlet 74 to a region on conduit 72 proximal to fluid inlet port 76 so that the smallest internal diameter, D2, of fluid conduit 72 is located within the region proximal fluid inlet port 76.

In the normal operation of dispenser 70 using a fitted cartridge (not shown), a main fluid stream is directed into dispenser 70 through dispenser valve inlet 73 at a first fluid velocity, moves through a fluid conduit 72 and exits dispenser 70 by way of dispenser valve outlet 74. As the main fluid stream moves through conduit 72, the fluid outlet port 75 of inline dispenser 70 directs a secondary fluid stream originating from the main fluid stream axially upwards into the fitted cartridge at a lower fluid velocity through the closed flow path created by the mating between a water inlet port of the fitted cartridge (not shown) and the fluid outlet port 75 of inline dispenser 70. The fluid inlet port 76 of the inline dispenser then directs the secondary fluid stream axially downward from the fitted cartridge (not shown) through the direct closed flow path formed by the mating between a water outlet port of the fitted cartridge (not shown) and the fluid inlet port 76 of inline dispenser 70 and back into the main fluid stream through a conduit orifice 78 located within the region proximal to fluid inlet port 76, which is the region of fluid conduit 72 having the smallest internal diameter. As the secondary fluid stream flows through the fitted cartridge (not shown), purification materials are released into the secondary fluid stream. Directing the secondary fluid stream back into the main fluid stream results in the main fluid stream exiting dispenser 70 through dispenser valve outlet 74 at a second fluid velocity.

Referring back to FIG. 9, unlike the afore described use of the fitted cartridge with inline dispenser 70, which requires that the fitted cartridge be directly mated to dispenser 70, in the embodiment of FIG. 9 the applicant's water purification device 20 is shown located within internal chamber 77 of inline dispenser 70 with ports 21*b*, 23*a*, 25*a*, and 32 of water purification device 20 all spaced from the fluid ports 75 and 76 of inline dispenser 70 to thereby form an open flow path. The open flow path permits the secondary fluid stream to linger within internal chamber 77 so that water purification device 20 can dispenser proper purification material into the secondary fluid stream before the secondary fluid stream is directed from internal chamber 77 back into the main fluid stream.

In addition, unlike the use of the fitted cartridge with inline dispenser 70, water purification device 20 when use in combination with inline dispenser 70 also need not be confined or secured to inline dispenser 70 but instead can be "free standing" within the internal chamber 77 of the dispenser housing 71. Although water purification 20 can also alternatively be placed between the fluid ports of inline dispenser 70 in the same fashion as shown in FIG. 8, FIG. 9 shows water purification device 20 supported within internal chamber 77 on the side of water purification 20. In supporting water purification device 20 on the side, one of the scallop 21*e* of water purification device 20 is shown engaging a bottom surface 71*a* of housing 71 so as to provide greater surface area for the support of water purification device 20 on bottom surface 71*a*.

Note that no matter how water purification device 20 is supported within internal chamber 77, similar to FIGS. 7 and 8, inlet 21*a*, 25*a*, and 32 and outlet 23*a* of water purification device 20 are all spaced from fluid outlet port 75 and fluid inlet port 76 of dispenser 70 thereby forming an open flow path. Since water purification device 20 does not require water inlets 21*b*, 25*a*, and 32 and outlets 23*a* to be directly connected to or engaging the fluid ports of inline dispenser 70 in order for water purification device 20 to dispense proper purification material, applicant's combination inline dispenser and water purification device 20 that forms an open flow path the inline dispenser allows one to use water purification device 20 in inline dispenser 70 which normally uses a fitted cartridge.

In the operation of dispenser 70 with water purification device 20 as shown in FIG. 9, purification device 20 is shown occupying a portion of the internal chamber 77 of the inline dispenser housing 70 with water purification device 20 dimensioned such that water purification device 20 cannot block the fluid outlet port 75 of dispenser 70 and preclude fluid flow through internal chamber 77.

A main fluid stream is directed into dispenser 70 through a dispenser valve inlet 73 at a first fluid velocity, and moves through a fluid conduit 73 and exits dispenser 70 by way of a dispenser valve outlet 74. As the main fluid stream moves through conduit 72, fluid outlet port 75 directs a secondary fluid stream originating from the main fluid stream axially upward into the internal chamber 77 of the inline dispenser 70. Since water purification device 20 has no ports to directly mate with the fluid ports of inline dispenser 70, there is no direct path for the secondary fluid stream to flow from the fluid outlet port of the dispenser 70 to the water purification device 20. As a result, the secondary fluid stream takes a non-direct path to the water purification device 20 by first flowing into internal chamber 77, thereby filling the internal chamber 77 of inline dispenser 70 with fluids. As the fluid outlet port 75 directs the secondary fluid stream into internal chamber 77 the fluid inlet port 76 of inline dispenser 70 directs the secondary fluid stream axially downward from the internal chamber 77 of inline dispenser 70 and back into the main fluid stream through a conduit orifice 78 located within the region proximal to fluid inlet port 76. Introducing the secondary fluid stream back into the main fluid stream results in the main fluid stream exiting dispenser 70 through dispenser valve outlet 74.

In the embodiment of FIG. 9, as the fluid outlet port 75 continues to direct the secondary fluid stream upward into the internal chamber 77, a fluid level within the internal chamber 77, denoted by a fluid line 77*a*, will increase. When the fluid level within the internal chamber 77 of inline dispenser 70 reaches to a level where the inlets 21*b*, 25*a*, and 32 of the water purification device 20 are below the fluid line 77*a*, a portion of the secondary fluid stream can flow through water purification device 20 by water ports 21*b*, 23*a*, 25*a*, and 32 of water purification device 20 to thereby allow for the proper dispensing of water purification materials.

FIG. 10 shows a further alternative embodiment of applicant's open path system comprising a water purification device 20 located in a chamber 85 of an inline dispenser 80. Inline dispenser 80 is further disclosed in U.S. Pat. No. 5,660,802 and is manufactured by Fountainhead Technologies, Inc., located in Ft. Lauderdale, Fla. As shown, inline dispenser 80 includes a housing 81. Located within housing 81 is internal chamber 85, which is capable of supporting water purification device 20 freely therein. The lower portion of internal chamber 85 includes a fluid outlet port 86 for directing a secondary fluid stream into internal chamber 85 and a fluid inlet port 87 for directing a secondary fluid stream out of internal chamber 85. The fluid outlet port 85 and the fluid inlet port 86 are both shown located proximal the midpoint region between the dispenser valve inlet 83 and a dispenser valve outlet 84 of dispenser 80.

In the operation of dispenser 80 with a fitted cartridge (not shown), a main fluid stream is directed into dispenser 80 through dispenser valve inlet 83 at a first fluid velocity, moves through fluid conduit 82 and exits inline dispenser 80 by way of dispenser valve outlet 84. As the main fluid stream moves through conduit 82, a fluid outlet port 86 directs a secondary fluid stream originating from the main fluid stream axially upward into the fitted cartridge (not shown) located within the internal chamber 85 through the direct closed flow path formed by the mating between a water inlet port of the fitted cartridge (not shown) and the fluid outlet port 86 of inline dispenser 80. The secondary fluid stream enters the fitted cartridge (not shown), flows through the interior of the fitted cartridge (not shown) and exits the fitted cartridge through a fitted cartridge outlet (not shown) into internal chamber 85. As the secondary fluid stream flow through the fitted cartridge (not shown), purification materials located therein are released into the secondary fluid stream and are carried by the secondary fluid stream into internal chamber 85.

The fluid inlet port 87 then directs the secondary fluid stream in internal chamber 85 axially downward and back into the main fluid stream. The introduction of the secondary fluid from internal chamber 85 back into the main fluid stream causes the main fluid stream to exit inline dispenser 80 through dispenser valve outlet 84 at a second fluid velocity.

Referring back to FIG. 10, unlike in the use of a fitted cartridge with inline dispenser 80, which requires that the fitted cartridge be directly mated to inline dispenser 80, applicant's water purification device 20 is shown located within inline dispenser 80, with inlets 21*b*, 25*a*, and 32 and outlets 23*a* of water purification device 20 not connected nor engaging either fluid outlet port 86 or fluid inlet port 87 of inline dispenser 80. Instead, inlets 21*b*, 25*a*, and 32 and outlet 23*a* of water purification device 20 are shown in FIG. 10 spaced from both fluid ports of inline dispenser 80 to thereby form an open flow path. The open flow path permits the secondary fluid stream to linger within internal chamber 85 of dispenser 80 so that purification device 20 is able to dispense proper purification material into the secondary fluid stream before the secondary fluid stream is directed from the internal chamber back into the main fluid stream. The water purification device 20 does not require water inlets 21*b*, 25*a*, and 32 and outlets 23*a* to be directly connected to or engaging the fluid ports of inline dispenser 80 in order for water purification device 20 to dispense proper purification material. The applicant's combination inline dispenser 80 and non-fitted water purification device 20 that forms an open flow path through the inline dispenser allows one to use water purification device 20 in inline dispenser 80 which normally uses a fitted cartridge thus eliminating the need for a fitted cartridge.

Also note that since water purification device 20 is not mated directly to the fluid ports of inline dispenser 80, support for water purification device 20 within internal chamber 85 of inline dispenser 80 can be by way of an interior wall surface 80*a* of inline dispenser 80, interior wall surface 80*a* of inline dispenser 80 tapering towards fluid conduit 82 so as to provide stability to water purification device 20. Similar to FIGS. 7 and 7A, when water purification device 20 is circumferentially supported within inline dispenser 80 by interior wall surface 80*a*, scallops 21*e*, 21*f*, and 21*g* located on the side of water purification device 20 forms openings with the interior wall surfaces of inline dispenser 80 (not shown) to allow for water to flow therethrough.

In the operation of inline dispenser 80 with the water purification device 20, purification device 20 is shown occupying a portion of the internal chamber 85 of the inline dispenser housing 81 with water purification device 20 dimensioned such that water purification device 20 cannot block the fluid outlet port 86 of dispenser 80 and preclude fluid flow through internal chamber 85.

A main fluid stream is directed into dispenser 80 through a dispenser valve inlet 83 at a first fluid velocity, and moves through a fluid conduit 82 and exits dispenser 80 by way of a dispenser valve outlet 84. As the main fluid stream moves through conduit 82, the fluid outlet port 86 of inline dispenser 80 directs a secondary fluid stream originating from the main fluid stream axially upward into the internal chamber 85 of the inline dispenser 80. Since the purification device 20 has no ports to mate with the fluid ports of inline dispenser 80, there is no direct path for the secondary fluid stream to flow from the fluid outlet port of the dispenser 80 to the water purification device 20. As a result, the secondary fluid stream takes a non-direct path to the water purification device 20 by first flowing into internal chamber 85, thereby filling the internal chamber 85 of inline dispenser 80 with fluids. As the fluid outlet port 86 directs the secondary fluid stream into internal chamber 85, the fluid inlet port 87 of inline dispenser 80 directs the secondary fluid stream axially downward from the internal chamber 85 of inline dispenser 80 and back into the main fluid stream. The movement of the secondary fluid stream back into the main fluid stream results in the main fluid stream exiting dispenser 80 through dispenser valve outlet 84 at a second fluid velocity.

In FIG. 10, as the fluid outlet port 86 continues to direct the secondary fluid stream upward into internal chamber 85, a fluid level within the internal chamber 85, denoted by a fluid line 85*a*, will increase. When the fluid level within the internal chamber 85 of inline dispenser 80 reaches to a fluid level where the inlets 21*b*, 25*a*, and 32 of the water purification device 20 are below the fluid line 85*a*, a portion of the secondary fluid stream is can flow through water purification device 20 via water ports 21*b*, 23*a*, 25*a*, and 32 of water purification device 20 to thereby allow for the proper dispensing of water purification materials.

The present invention thus is a combination of a free standing water purification material container and an inline dispenser normally having fluid ports directly mateable to the ports of a fitted cartridge. The water purification device 20 id located freely within the dispenser housing with the water ports of the water purification device 20 spaced from the fluid outlet port and the fluid inlet port of the dispenser housing to form an open flow path and to prevent blocking of the ports. Since water purification device 20 does not require water inlets 21*b*, 25*a*, and 32 and outlets 23*a* be directly connected to or engaging the fluid ports of the inline dispenser to dispense proper purification material, applicant's combination inline dispenser and water purification device 20 forms an open flow path through the inline dispenser and thus allows one to use water purification device 20 in inline dispensers which normally uses a fitted cartridge thereby providing a universal cartridge for use with inline dispensers.

The present invention also comprises the method of replacing a closed flow path system wherein a fitted cartridge has an inlet port directly mated to the fluid outlet port of an inline dispenser and has an outlet return port directly mated to the fluid inlet port of the inline dispenser with an open flow path system wherein the cartridge ports do not directly mate with the fluid ports of the inline dispenser. The steps include: (1) removing the cover of the water purification material inline dispenser; (2) disconnecting the mating fitting between the fitted water purification cartridge ports and the inline dispenser fluid ports; (3) removing the fitted water purification cartridge from the internal chamber of the purification material inline dispenser; (4) inserting a non-fitted water purification device 20 within the internal chamber of the inline dispenser with the fluid ports of the purification device spaced from the fluid ports of the inline dispenser; and (5) connecting the cover back on the purification material inline dispenser.

It should be pointed out that the universal container described herein is characterized by being a non-fitted cartridge that is sufficiently small so as to be able to be placed in a number of different inline dispensers and still allow for fluids to flow into the dispenser. In addition, if desired the universal container and the water treatment material could be integral to each other.

Figure 11:
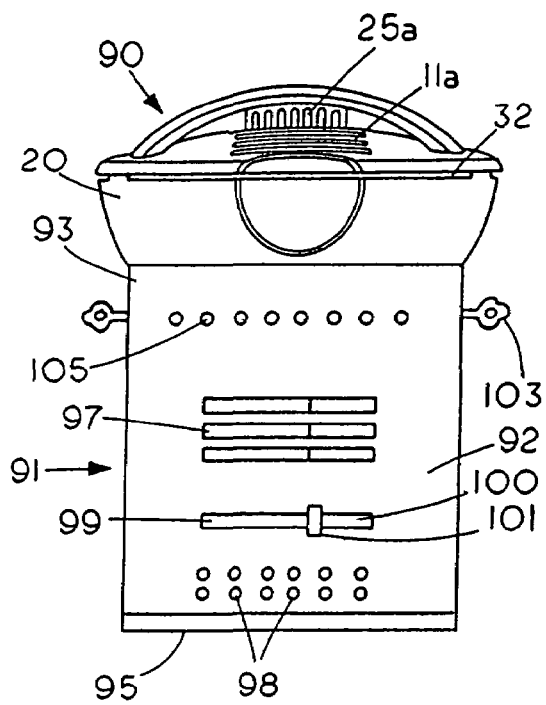
FIG. 11 shows a front view of a two-piece dual dispensing cartridge that can be used as the water purification container for applicant's combination inline dispenser and water purification container.
Figure 12:
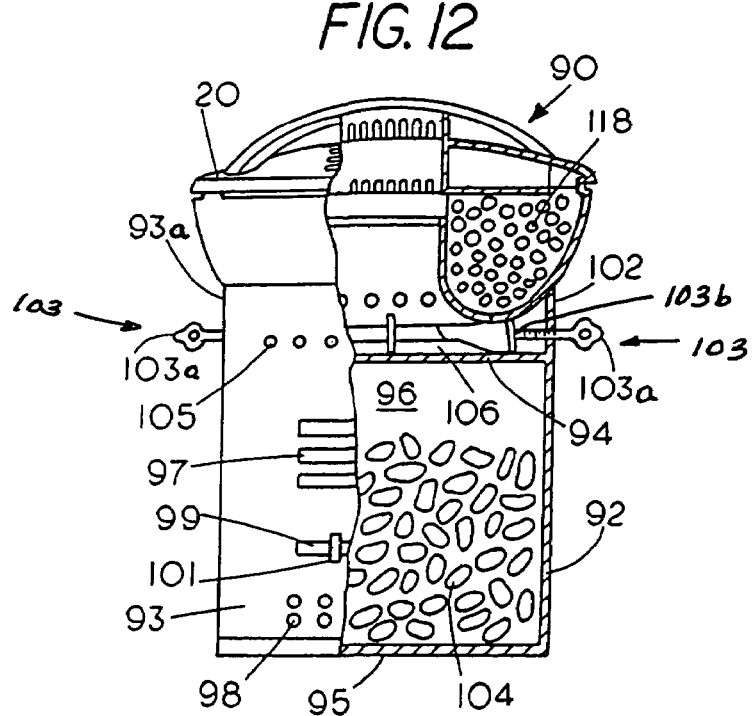
FIG. 12 shows a partial cross-sectional view of the two-piece dual dispensing cartridge of FIG. 11.

FIG. 11 shows a front view and FIG. 12 shows a partial cross-sectional view of a two-piece dual dispensing cartridge 90 that can be used as the water purification container for applicant's combination inline dispenser and water purification container. The dual dispensing cartridge 90 comprises water purification material device 20, shown in FIGS. 3-6, attached to a rate adjustable material dispenser 91.

Typically, material dispenser 91 is made of a lightweight plastic or the like. Material dispenser 91 includes a housing 92 having a first end 94, a second end 95. Located within material dispenser 91 is an internal chamber 96 for holding a dispensing material 104. Although dispensing material 104 in the present embodiment comprises a mineral containing chlorine, bromine, or the like, other fluid dispensing materials may be carried by material dispenser 91 such as bacteria killing materials, algaecide, clarifiers and pH adjustment materials.

Located on the wall 93 of material dispenser 91 proximate the first end 94 of housing 92 is a plurality of openings comprising a fluid port 97 for the ingress and egress of fluids and located proximate second end 95 of housing 92 is a plurality of opening comprising a fluid port 98 for the ingress and egress of fluids from material dispenser 91. Located on the housing between the port 97 and the port 98 of material dispenser 91 is an opening comprising a gate guide 99. Slidably secured to the interior surface of housing 92 is a gate 100 for controlling the dispensing of minerals located within material dispenser 91 of dual dispensing cartridge 90. Located on gate 100 and protruding out through gate guide 99 of material dispenser 91 is a gate handle 101 for slidably moving gate 100 to control the size of fluid port 97 and fluid port 98 thereby controlling the flow of fluids through material dispenser 91. Although the present embodiment includes the use of a gate for controlling the flow of fluids through material dispenser 91, alternative embodiments may include a material dispenser having no fluid flow controlling mechanism.

As shown in FIG. 12 material dispenser 91 includes a cylindrical wall 93 extending beyond the first end 93 of material dispenser 91 to form a mouth 102 for engaging water purification device 20. Water purification device 20 is secured to the mouth 102 of material dispenser 91 by a set of locking pins 103. Although FIGS. 11 and 12 show water purification device 20 secured to mouth 102 of material dispenser 91 by locking pins 103, water purification device 20 may alternatively be secured to mouth 102 of material dispenser 91 by other methods including an adhesive, by a snap-on mechanism, or by a threaded mechanism. The second container is separate from the first container, which allows the second container separable from the first and vice versa. The separable feature allows one to replace one of the dispensing devices while retaining the other. Located on housing 92 between the first end 94 and mouth 102 is a plurality of ports 105. The engagement of water purification device 20 to the mouth 102 of material dispenser 91 forms a chamber 106 for directing the flow of fluids from water purification device 20 through plurality of ports 105.

Figure 13:
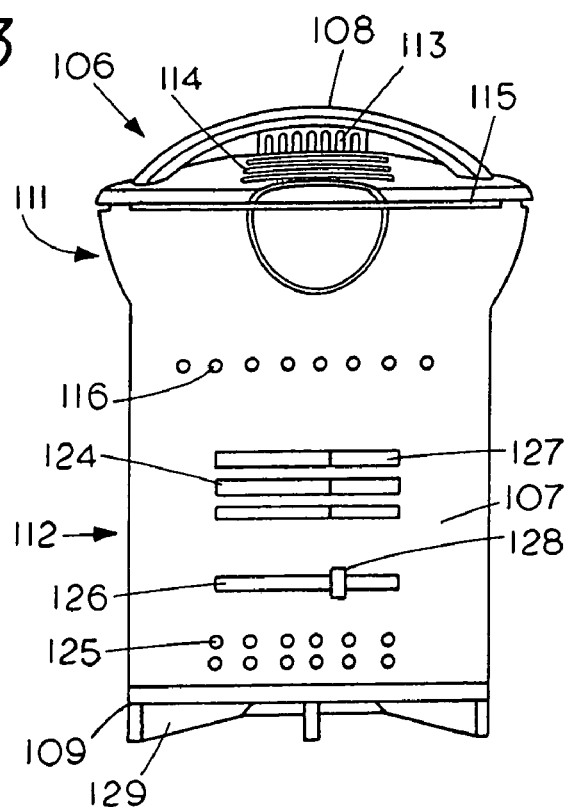
FIG. 13 shows a front view of a one-piece dual dispensing cartridge that can be used as the water purification container for applicant's combination inline dispenser and water purification material container.
Figure 14:
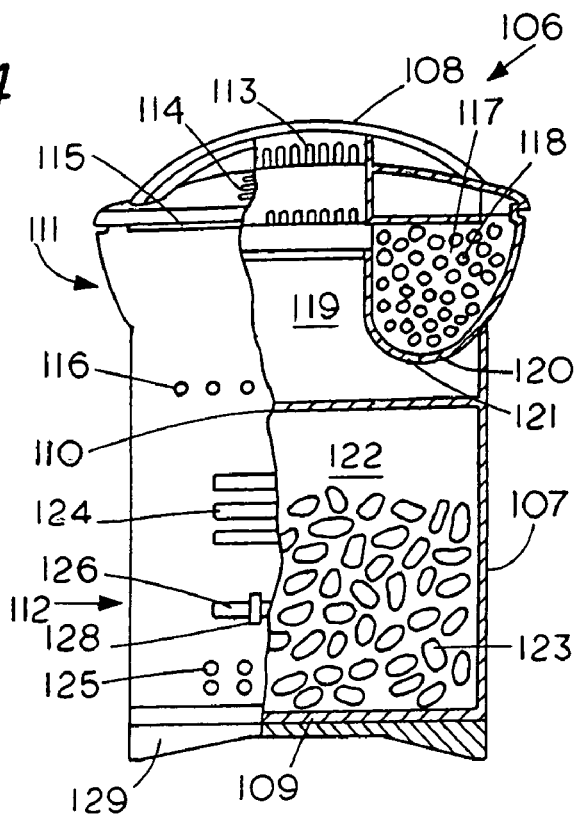
FIG. 14 shows a partial cross-sectional view of the one-piece dual dispensing cartridge of FIG. 13.

FIG. 13 shows a front view and FIG. 14 shows a partial cross-sectional view of a one-piece dual dispensing cartridge 106 that can be used alternatively as the water purification container for applicant's combination inline dispenser and water purification material container. Dual dispensing cartridge 106 is typically made of a lightweight plastic or the like.

The one-piece dual dispensing cartridge 106 includes a housing 107 having a first end 108, a second end 109, and a central dividing wall 110 dividing housing 107 into two portions. In the present embodiment the portion of the housing 107 located proximate to the first end 108 of housing 107 comprises a water purification material dispensing container 111 and the portion of the housing 107 located proximate the second end of the housing 107 comprises a material-dispensing container 112.

The water purification material-dispensing container 111, as shown in FIGS. 13 and 14, has a spherical shaped body. Located on the purification material-dispensing container 111 proximate the first end of housing 108 are several set of openings comprising a plurality of fluid ports 113, 114, and 115 of water purification material-dispensing container 111. Located on water purification material-dispensing container 111 proximate the central dividing wall 110 (shown in FIG. 14) is a plurality of opening comprising a fluid port 116 of water purification material-dispensing container 111.

As shown in FIG. 14, located within the interior of material-dispensing container 111 is a compartment 117 for holding a water purification material 118 and an internal chamber 119 for directing the flow of fluids through fluid port 116 of water purification material-dispensing container 111. Separating the compartment 117 from the internal chamber 119 of water purification material-dispensing container 111 is a wall 120 having a plurality of ports 121 located thereon. The ports 121 are sufficiently small to keep water purification materials 118 within the compartment 117 while allowing for the flow of fluids therethrough.

In the operation for the dispensing of water purification material 118, normally a fluid flow is directed into water purification material-dispensing container 111 by ports 113, 114, and 115 and out of water purification material-dispensing container 111 through fluid port 116. As the fluid flow is directed through water purification material-dispensing container 111 a portion of the fluid flow is directed into compartment 117. While in compartment 117, water purification material 118 located therein is released into the fluid flow. After water purification material is released into the fluid flow, the fluid flow is directed out of compartment 117 through ports 121.

In regards to the material-dispensing container 112, material-dispensing container 112 as shown in FIGS. 13 and 14 comprises a cylindrical body. As shown in FIG. 14, located within the material-dispensing container 112 is an internal chamber 122 for holding a dispensing material 123. Dispensing material 123 can comprises a mineral containing chlorine, bromine, or other fluid dispensable materials. Located on the material-dispensing container 112 proximate the central dividing wall 110 is a plurality of opening for the ingress and egress of fluids comprising the fluid ports 124 of material-dispensing container 112. Located on the material-dispensing container 112 proximate the second end 109 of the housing 107 is a plurality of openings for the ingress and egress of fluids comprising the fluid ports 125 of material-dispensing container 112. Located on the housing 107 between the port 124 of the material dispenser 112 and the port 125 of the material dispenser 112 is an opening comprising a gate guide 126. Slidably secured to the interior surface of housing 107 is a gate 127 for controlling the dispensing of a fluid dispensable material such as materials 123 located within the material dispenser 112. Located on gate 127 and protruding out through gate guide 126 of material-dispensing container 112 is a gate handle 128 for slidably moving gate 127 to control the size of fluid port 124 and fluid port 125 of the material dispenser 112 thereby controlling the flow of fluids through material-dispensing container 112.

Although the embodiment of FIGS. 13 and 14 includes the use of gate 127 for controlling the flow of fluids through material-dispensing container 112, alternative embodiments may include a material-dispensing container having no fluid flow controlling mechanism.

The one-piece dual dispensing cartridge 106 of FIGS. 13 and 14 also include a plurality of legs 129 attached to the second end 109 of the dual dispensing cartridge 106 for supporting cartridge 106 within the inline dispenser.

Figure 15:
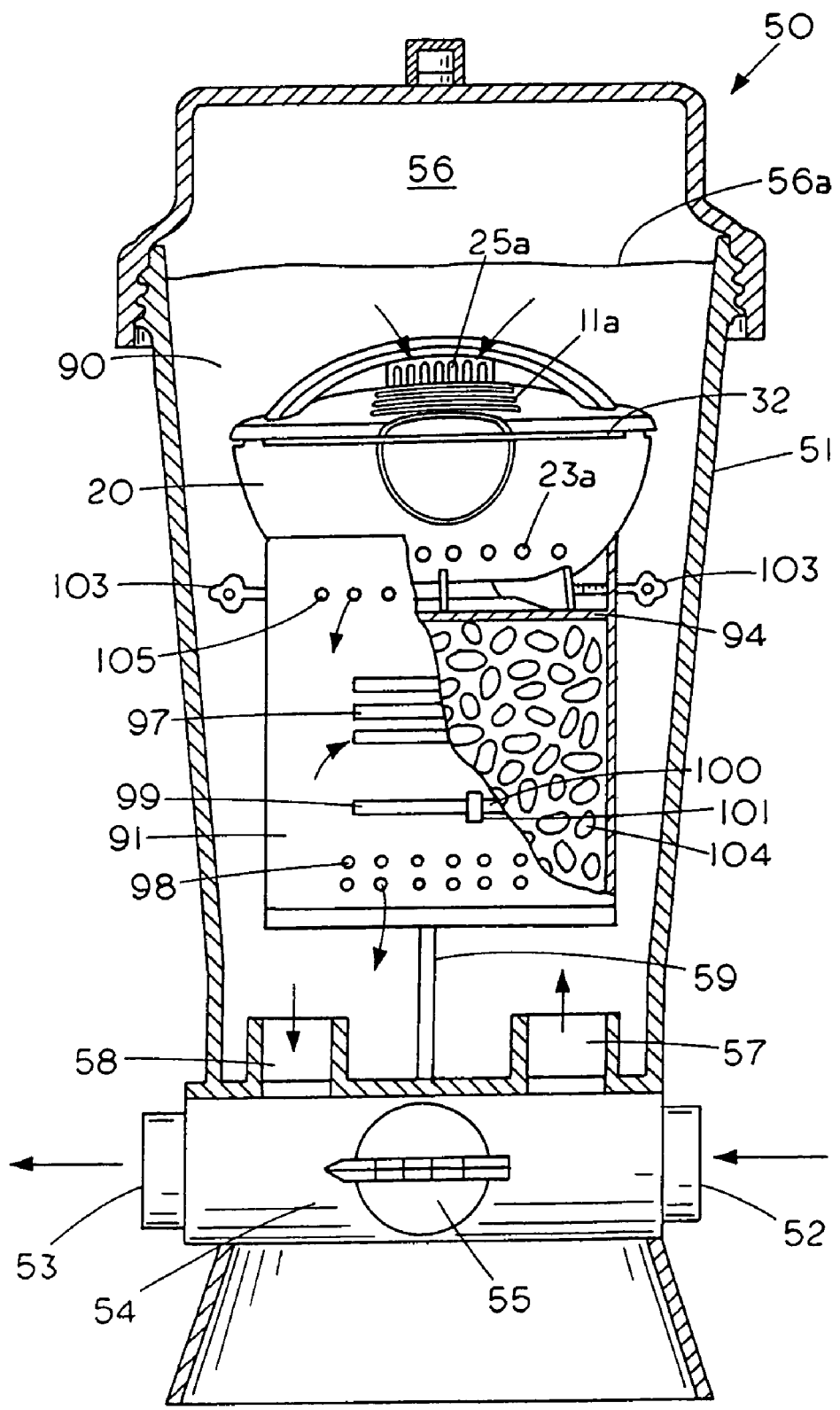
FIG. 15 is a partial cross-sectional view showing the two-piece dual dispensing cartridge freely supported within the inline dispenser of FIG. 7.

FIG. 15 is a partial cross-sectional view showing applicant's open path system comprising two-piece dual dispensing cartridge 90 and an inline dispenser 50 as disclosed in FIG. 7. As shown, internal chamber 56 is capable of supporting dual dispensing cartridge 90 freely therein.

FIG. 15 illustrates that dual dispensing cartridge 90 need not be confined or secured to inline dispenser 50 but instead can be "free standing" within the internal chamber 56 of the dispenser housing 51, dual dispensing cartridge 90 is shown in FIG. 15 supported within inline dispenser 50 by the flange or vertical member 59 and the interior wall surfaces of housing 51, instead of by the fluid ports as shown in FIG. 2.

In the operation of inline dispenser 50 with dual dispensing cartridge 90, dual dispensing cartridge 90 occupies a portion of the internal chamber 56 of the inline dispenser housing 51 with dual dispensing cartridge 90 dimensioned such that dual dispensing cartridge 90 cannot block the fluid outlet port 57 of dispenser 50 and preclude fluid flow through internal chamber 56. FIG. 15 shows Flange 59 supporting dual dispensing cartridge 90 within internal chamber 56 in a spaced condition above the fluid outlet port and the fluid inlet port so as not to engage and block fluid flow through the fluid outlet port 57 and the fluid inlet port 58 of inline dispenser 50.

A main fluid stream is directed into dispenser 50 through a dispenser valve inlet 52 at a first fluid velocity, and moves through a fluid conduit 54 (indicated by arrows) and exits dispenser 50 by way of a dispenser valve outlet 53. As the main fluid stream moves through conduit 54, fluid outlet port 57 directs a secondary fluid stream originating from the main fluid stream axially upward into internal chamber 56. The size of the secondary fluid stream directed axially upward into the internal chamber 56 is controlled by an inline dispenser controller 55. Since dual dispensing cartridge 90 has no ports to mate with the fluid ports of inline dispenser 50, there is no direct path for the secondary fluid stream to flow from the fluid outlet port of the dispenser 50 to dual dispensing cartridge 90. As a result, the secondary fluid stream takes a non-direct path to the dual dispensing cartridge 90 by first flowing into internal chamber 56, thereby filling the internal chamber 56 of inline dispenser 50 with fluids. In spite of the lack of a direct path I have found that I can properly dispense both a first dispensing material such as a water purification materials and a second dispensing material such as chlorine, bromine or other fluid dispensable material into the system through an open path system.

In the embodiment of FIG. 15, as the fluid outlet port 57 continues to direct the secondary fluid stream upward into the internal chamber 56, the fluid level within the internal chamber 56, denoted by the fluid or water line 56a, will increase. When the fluid level within the internal chamber 56 of inline dispenser 50 reaches to a level where the port 97 of the material dispenser 91 are below fluid line 56a, a portion of the secondary fluid stream enters through material dispenser 91 through port 97 and port 98 of material dispenser 91 to thereby allowing for the dispensing of minerals such as chlorine and bromine. The amount of material that is dispensed by material dispenser 91 of the dual dispensing cartridge 90 can be controlled independently of the control of the fluid flowing through dispenser 50 by controlling the size of fluid port 97 and fluid port 98 of the material dispenser 91 through the sliding of gate 100 by way of gate handle 101.

In addition, when the fluid level within the internal chamber 56 of inline dispenser 50 reaches to a level where the inlets 21b, 23a, 25a, and 32 of the water purification device 20 are below fluid line 56a, a portion of the secondary fluid stream is permitted to enter through dual dispensing cartridge 90 by fluid ports 21b, 23a, 25a, and 32 of water purification device 20 and fluid port 105 of material dispenser 91 to thereby allow for the proper dispensing of water purification materials.

Fluid inlet port 58 then directs the secondary fluid stream axially downward from the internal chamber 56 back into the main fluid stream. The movement of the secondary fluid stream back into the main fluid stream results in the main fluid stream exiting dispenser 50 through dispenser valve outlet 53 at a second fluid velocity.

Applicant's open path system of FIG. 15 thus can allow the user to regulate the dispensing of materials in two separate methods. The first method in regulating the dispensing of the materials is by controlling the size of the secondary fluid stream that enters the internal chamber 56 of inline dispenser 50 by inline dispenser controller 55. Controlling the size of the secondary fluid stream that enters the internal chamber 56 will allow a user to regulate the amount of materials that are dispensed from water purification device 20 and the amount of materials that are dispensed from material dispenser 91. The second method in regulating the dispensing of materials is by controlling the amount of fluids that flows through material dispenser 91 from internal chamber 56 of dispenser 50 by controlling the size of fluid port 97 and fluid port 98 of the material dispenser 91 through the sliding of gate 100 by way of gate handle 101.

FIG. 16 shows a front view and FIG. 17 shows a partial cross-sectional view of an alternative embodiment of a one-piece dual dispensing cartridge 130 that can be used as the water purification container for applicant's combination inline dispenser and water purification material container. The dual dispensing cartridge 130 of FIGS. 16 and 17 comprises a cylindrical housing 131 having a first end 132, a second end 133 and having a central member 134 (shown in FIG. 17) located there between. Central member 134 separates housing 131 into a first chamber 135 for holding a first dispensing material and a second chamber 137 for holding a second dispensing material. In the present embodiment the first dispensing material 136 comprises a water purification material and the second dispensing material 138 comprise a mineral, chlorine, bromine, or other fluid dispensable material.

Located on the first chamber 135 proximate the first end 132 of the dual dispensing cartridge 130 is a first set of openings 139 of the first chamber 135 and located on the first chamber 135 proximate central member 134 is a second set of openings 140 of first chamber 135. The first set of openings 139 and the second set of openings 140 comprises the fluid ports of the first chamber 135 for the ingress and egress of fluids therethrough to thereby allow for the dispensing of water purification material 136 located therein.

Located on the first chamber 135 between the first set of openings 139 and the second set of openings 140 is a first gate guide 141. As shown in FIG. 18, slidably secured to an interior surface 143 of the first chamber 135 of the housing 131 is a first gate 142 for controlling the dispensing of water purification material 136 located within the first chamber 135. Securement of the first gate 142 to the interior surface 143 of the first chamber 135 is further shown in FIG. 18. Located on the first gate 142 and protruding out through the gate guide 141 of the first chamber 135 is a gate handle 144 for slidably moving the first gate 142 to control the size of openings 139 and 140 of the first chamber 135 to thereby control the rate of water purification material 136 dispensed by the first chamber 135.

Located on the second chamber 137 proximate the central member 134 is a first set of openings 145 of the second chamber 137 and located on the second chamber 137 proximate the second end 133 of the dual dispensing cartridge 130 is a second set of openings 146 of the second chamber 137. The first set of openings 145 and the second set of openings 146 of the second chamber 137 comprises the fluid ports of the second chamber 137 for the ingress and egress of fluids therethrough to thereby allow for the dispensing of minerals 138 such as chlorine and bromine located therein. Located on the second chamber 137 between the first set of openings 145 and the second set of opening 146 of the second chamber 137 is a second gate guide 147.

Slidably secured to an interior surface 148 of the second chamber 137 of the housing 131 is a second gate 149 for controlling the dispensible material of second dispensing 138 located therein. Securement of the second gate 149 to the interior surface 148 of the second chamber is also further shown in FIG. 18. Located on the second gate 149 and protruding out through the gate guide 147 of the second chamber 137 is a gate handle 150 for slidably moving the second gate 149 to control the size of the openings 145 and 146 of the second chamber 137 to thereby control the rate of material 138 dispensed by the second chamber 137.

FIG. 18 is a partial cross-sectional view showing the securement of the first gate 142 to the interior surface 143 of the first chamber 135 and the securement of the second gate 149 to the interior surface 148 of the second chamber 137.

As shown, located on the interior surface 143 of the first chamber 135 between the first end 132 of the housing 131 and the first set of openings 139 of the first chamber 135 is a first gate support 151 and located on the interior surface 143 of the first chamber 135 between the central member 134 and the second set of openings 140 of the first chamber is a second gate support 152 for slidably securing the first gate 142 to the interior surface 143 of the first chamber 135.

Located on the interior surface 148 of the second chamber 137 between the central member 134 and the first set of openings 146 of the second chamber 137 (shown in FIGS. 16 and 17) is a third gate support 153 and located on the interior surface 148 of the second chamber 137 between the second end 133 of housing 131 and the second set of openings 146 of the second chamber 137 (shown in FIGS. 16 and 17) is a fourth gate support 154 for slidably securing the second gate 149 to the interior surface 148 of the second chamber 137.

FIG. 19 is a partial cross-sectional view of an alternative embodiment of a dual dispenser cartridge 155. The dual dispensing cartridge 155 of FIG. 19 comprises a cylindrical housing 156 having a first end 157, a second end 158 and having a central member 159 located between the first end 157 and the second end 158 that separates housing 156 into a first chamber 160 for holding a first fluid dispensable material 161 such as a water purification material and a second chamber 162 for holding a second fluid dispensable material 163 such as a mineral, chlorine and bromine. The dual dispenser cartridge 155 of FIG. 19 is similar to dual dispenser cartridge 130 except that the dual dispenser cartridge 155 does not include a gate located in the first chamber 160 for controlling the dispensing of the first dispensable material 161.

Although the embodiments of FIGS. 16-19 includes the use of a gate for controlling the flow of fluids through the chambers, alternative embodiments of the dual dispenser cartridge may include a dual dispenser cartridge having all of the chambers with no fluid flow controlling mechanism or a dual dispenser cartridge having all of its chambers a preset nonadjustable fluid flow.

Figure 20:
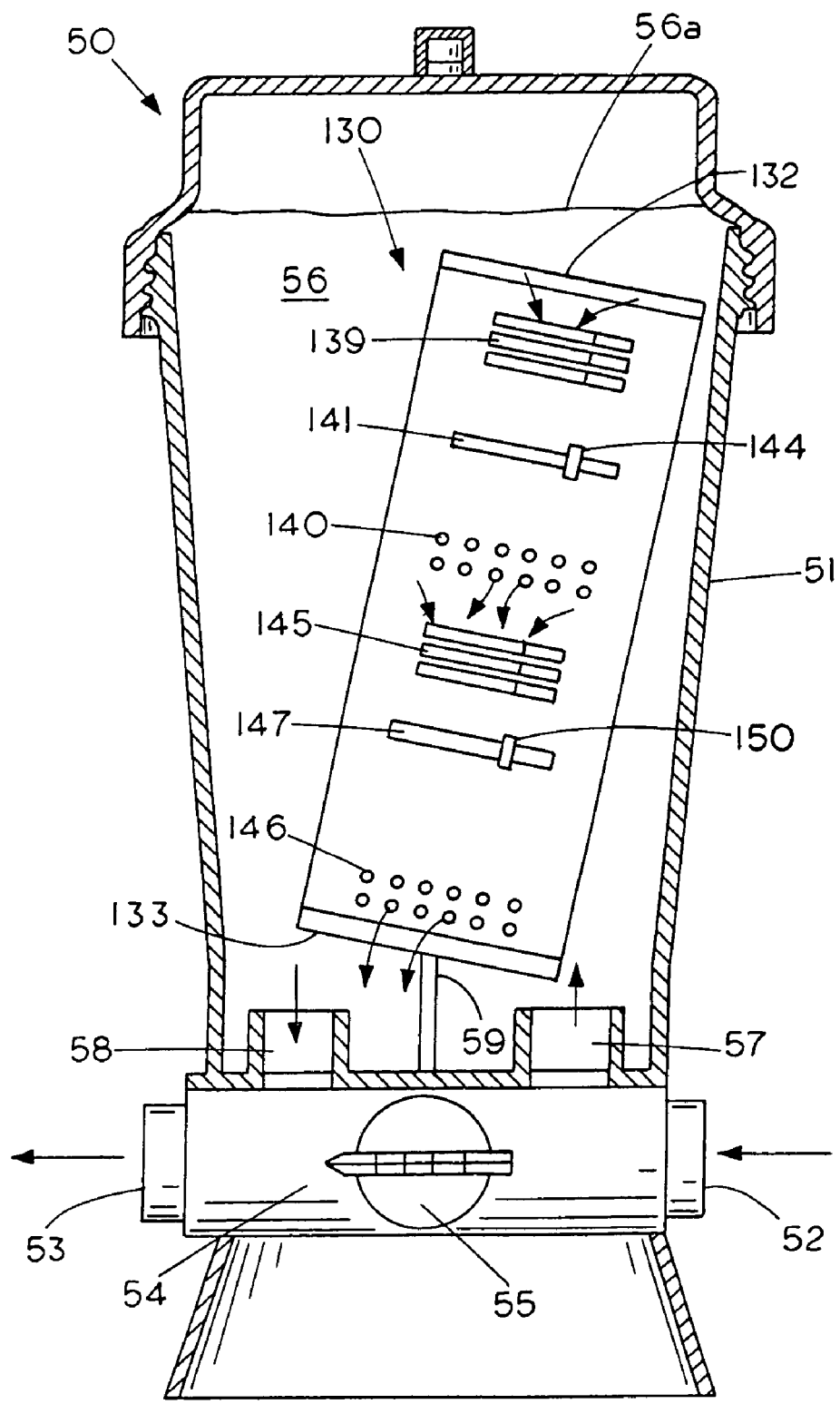
FIG. 20 is a partial cross-sectional view showing the inline dispenser of FIG. 7 supporting the cylindrical dual dispensing cartridge of FIG. 16 therein.

FIG. 20 is a partial cross-sectional view showing applicant's open path system comprising the dual dispensing cartridge 130 of FIGS. 16-18 and the inline dispenser 50 as disclosed in FIG. 7. As shown, internal chamber 56 is capable of supporting dual dispensing cartridge 130 freely therein.

FIG. 20 illustrates that dual dispensing cartridge 130 need not be confined or secured to inline dispenser 50 but instead can be "free standing" within the internal chamber 56 of the dispenser housing 51, dual dispensing cartridge 130 is shown in FIG. 20 supported within inline dispenser 50 by the flange 59 and the interior wall surfaces of housing 51, instead of by the fluid ports of the dispenser as shown in FIG. 2.

In the operation of inline dispenser 50 with dual dispensing cartridge 130, dual dispensing cartridge 130 occupies a portion of the internal chamber 56 of the inline dispenser housing 51 with dual dispensing cartridge 130 dimensioned such that dual dispensing cartridge 130 cannot block the fluid outlet port 57 of dispenser 50 and preclude fluid flow through internal chamber 56. Similar to FIG. 15, FIG. 20 shows flange 59 supporting dual dispensing cartridge 130 within internal chamber 56 so as not to engage both the fluid outlet port 57 and the fluid port 58 of inline dispenser 50 to thereby blocking fluid flow.

A main fluid stream is directed into dispenser 50 through dispenser valve 52 at a first fluid velocity, and moves through a fluid conduit 54 (indicated by arrows) and exits dispenser 50 by way of dispenser valve outlet 53. As the main fluid stream moves through conduit 54, fluid outlet port 57 directs a secondary fluid stream originating from the main fluid stream axially upward into internal chamber 56. The size of the secondary fluid stream that is directed into internal chamber 56 can be controlled by inline dispenser controller 55. Since dual dispensing cartridge 130 has no ports to mate with the fluid ports of inline dispenser 50, there is no direct path for the secondary fluid stream to flow from the fluid outlet port 57 of the dispenser 50 to dual dispensing cartridge 130. As a result, the secondary fluid stream takes a non-direct path to the dual dispensing cartridge 130 by first flowing into internal chamber 56, thereby filling the internal chamber 56 of inline dispenser 50 with fluids. In spite of the lack of a direct path I have found that I can properly dispenser both water purification materials and minerals such as chlorine and bromine into the system through an open path system.

In the embodiment of FIG. 20, as the fluid outlet port 57 continues to direct the secondary fluid stream upward into the internal chamber 56, the fluid level within the internal chamber 56, denoted by the fluid or water line 56a, will increase. When the fluid level within the internal chamber 56 of inline dispenser 50 reaches to a level where the first set of openings 145 and the second set of opening 146 of the of the second chamber 137 are below the fluid line 56a, a portion of the secondary fluid stream is permitted to enter through the second chamber 137 through the opened portion of the first set of openings 145 and the second set of openings 146 of the second chamber 137 to thereby allow for the proper dispensing of the second dispensable material 138 such as chlorine and bromine located therein.

The amount of second dispensable material 138 dispensed by the dual dispensing cartridge 130 can be controlled by controlling the size of openings 139 and 140 of the dual dispensing cartridge 130 through the positioning of the second gate 149 by way of second gate handle 150.

When the fluid level within the internal chamber 56 of inline dispenser 50 reaches to a level where first set of opening 139 and second set of openings 140 of the first chamber 135 are below the fluid line 56a, a portion of the secondary fluid stream is permitted to enter through the opened portion of the first set of openings 139 and the second set of openings 140 of the first chamber 135 to thereby allow for the proper dispensing of water purification materials 136 located therein.

The amount of water purification material 136 that are dispensed by dual dispensing cartridge 130 can be controlled by controlling the size of the openings 145 and 146 of the dual dispensing cartridge 130 through the positioning of the first gate 142 by way of first gate handle 144.

A fluid inlet port 58 then directs the secondary fluid stream axially downward from the internal chamber 56 back into the main fluid stream. The movement of the secondary fluid stream back into the main fluid stream results in the main fluid stream exiting dispenser 50 through dispenser valve outlet 53 at a second fluid velocity.

Applicant's open path system of FIG. 20 thus allows the user to regulate the dispensing of materials in two separate methods. The first method in regulating the dispensing of the materials is by controlling the size of the secondary fluid stream that enters the internal chamber 56 of inline dispenser 50 by inline dispenser controller 55. Controlling the size of the secondary fluid stream that enters the internal chamber 56 will allow a user to regulate the amount of materials that are dispensed from first chamber 135 and the amount of materials that are dispensed from second chamber 137. The second method in regulating the dispensing of materials is by controlling the amount of fluids that flows through chambers 135 and 137 from internal chamber 56 of dispenser 50 by controlling the size of fluid port 97 and fluid port 98 of the material dispenser 91 through the sliding of gates 142 and 149 by way of gate handles 144 and 150.

I claim:

1. In combination:
   an inline dispenser having a dispenser housing with a closed chamber, and a dispenser valve for directing a main fluid stream therethrough, said inline dispenser housing having a fluid inlet port for directing a secondary fluid stream originating from said main fluid stream into the closed chamber in the dispenser housing and a fluid outlet port for directing said secondary fluid stream out of the closed chamber in the dispenser housing and back to said main fluid stream, said dispenser valve having an inline dispenser controller for controlling the size of said secondary fluid stream directed through said closed chamber;
   a first container located in said dispenser housing for dispensing a first water purification material therefrom as water flows through said first container; and
   a second container located in said housing for dispensing a second water purification material therefrom as water flows through said second container, said second container replaceable without replacing said first container or vice versa, said second container having a fluid port spaced from a fluid port in said first container to provide an open flow path between the fluid port in said first container and the fluid port in said second container as materials are dispensed from said first container and said second container, said first container and said second container dimensioned such that a member extending above the fluid inlet port and the fluid outlet port supports a bottom portion of the second container in a spaced condition above the fluid inlet port and the fluid outlet port so that the second container cannot block the fluid outlet port or the fluid inlet port of the dispenser and preclude fluid flow through the closed chamber.

2. The combination of claim 1 wherein the first container is secured to the second container by a locking pin.

3. The combination of claim 1 wherein the first container contains chlorine.

4. An inline dispenser for use in a pool, spa or hot tub comprising:
   a dispenser valve for directing a main water stream therethrough;
   an inline dispenser housing having an inlet fluid port for directing a secondary water stream originating from said main water stream into a closed chamber in the dispenser housing and an outlet fluid port for directing said secondary water stream out of the closed chamber in the dispenser housing and back to said main water stream;
   an inline dispenser controller for controlling the size of said secondary water stream directed through said closed chamber;
   a first container located in said dispenser housing for dispensing a first water purification material therefrom as water flows from said inlet fluid port into said first container, said first container having a fluid port therein for water to flow out of said first container; and
   a second container located in said housing for dispensing a second water purification material as water flows through said second container, said second container separable from said first container for replacing said second container independent of said first container or vice versa, said second container having a fluid port therein for water to flow into said second container; said second container separate from said first container to provide an open flow path between the fluid port in said first container and the fluid port in said second container to thereby dispense materials from said first container and said second container as water flows through the first container and the second container in said dispenser housing; and
   a vertical extending member located between said inlet fluid port and said outlet fluid port to prevent blockage of fluid flow through the outlet fluid port and the inlet fluid port.

5. The inline dispenser of claim 4 including an open flow path between said inlet fluid port in said housing and said first container.

6. The inline dispenser of claim 5 including an open flow path between said outlet fluid port in said housing and said second container.

* * * * *